United States Patent
Fein et al.

(10) Patent No.: US 7,522,552 B2
(45) Date of Patent: Apr. 21, 2009

(54) IMPROVING THE PERFORMANCE OF A WIRELESS CSMA-BASED MAC COMMUNICATION SYSTEM USING A SPATIALLY SELECTIVE ANTENNA

(75) Inventors: Yaron Fein, Rehovot (IL); Yaron Peleg, Tel Aviv (IL)

(73) Assignee: Patents - Professional Solutions (PRO-PATS) Ltd, Herzeliya (IL)

( * ) Notice: Subject to any disclaimer, the term of this patent is extended or adjusted under 35 U.S.C. 154(b) by 758 days.

(21) Appl. No.: 10/985,837

(22) Filed: Nov. 9, 2004

(65) Prior Publication Data

US 2005/0141545 A1   Jun. 30, 2005

(30) Foreign Application Priority Data

Nov. 10, 2003   (EP)   ................... 03025719

(51) Int. Cl.
  *H04Q 7/00* (2006.01)
  *H04Q 7/20* (2006.01)
  *H04Q 3/00* (2006.01)
  *H04L 12/413* (2006.01)
  *H04B 1/00* (2006.01)

(52) U.S. Cl. ............ 370/328; 370/455; 455/63.4; 455/450; 342/368

(58) Field of Classification Search .......... 370/328, 370/338, 445, 449, 450; 455/63.4, 450, 455; 342/368, 378
See application file for complete search history.

(56) References Cited

U.S. PATENT DOCUMENTS

| 5,231,634 | A | | 7/1993 | Giles et al. | |
|---|---|---|---|---|---|
| 6,188,913 | B1 | * | 2/2001 | Fukagawa et al. | 455/562.1 |
| 6,363,062 | B1 | * | 3/2002 | Aaronson et al. | 370/348 |
| 6,404,756 | B1 | * | 6/2002 | Whitehill et al. | 370/338 |
| 6,611,231 | B2 | | 8/2003 | Crilly, Jr. et al. | |
| 6,970,682 | B2 | * | 11/2005 | Crilly et al. | 455/78 |
| 7,075,902 | B2 | * | 7/2006 | El Batt | 370/310 |
| 7,170,873 | B1 | * | 1/2007 | Cisar et al. | 370/334 |
| 7,224,685 | B2 | * | 5/2007 | Proctor, Jr. | 370/349 |
| 2002/0158801 | A1 | * | 10/2002 | Crilly et al. | 342/378 |
| 2002/0172186 | A1 | * | 11/2002 | Larsson | 370/349 |
| 2002/0181426 | A1 | | 12/2002 | Sherman | |
| 2003/0120809 | A1 | | 6/2003 | Sastry et al. | |

(Continued)

OTHER PUBLICATIONS

European Search Report, EP03025719, Aug. 31, 2004, 10 pages.

(Continued)

*Primary Examiner*—Firmin Backer
*Assistant Examiner*—Nittaya Juntima
(74) *Attorney, Agent, or Firm*—Vladimir Sherman; Professional Patent Solutions

(57) ABSTRACT

Described herein is a device to be used in a wireless communication system with CSMA-based MAC, comprising a mechanism for transmitting at least a first and second Request-to-Send (RTS) messages and at least first and second data packets on a transmission medium, and a spatially selective antenna. In one aspect, the device uses a distributed antenna that combines the antenna elements of several devices and the device observes the transmissions of other devices, analyzes the observed transmissions for transmission patterns and adapts its own transmissions to the detected transmission patterns. Also described is a corresponding system, method and computer program to be used in a wireless communication system.

17 Claims, 8 Drawing Sheets

U.S. PATENT DOCUMENTS

2003/0227934 A1* 12/2003 White et al. ................ 370/432
2004/0004951 A1* 1/2004 Zuniga et al. ............... 370/338
2005/0063340 A1* 3/2005 Hoffmann et al. .......... 370/332
2005/0078707 A1* 4/2005 Maltsev et al. .............. 370/471
2005/0138199 A1* 6/2005 Li et al. ...................... 709/236

OTHER PUBLICATIONS

"IEEE Std 802.11, Part 11; Wireless LAN Medium Access Control (MAC) and Physical Layer (PHY) Specifications", ANSI, IEEE Std 802.11, 1999, XP002282917.

* cited by examiner

IMPROVING THE PERFORMANCE OF A WIRELESS CSMA-BASED MAC COMMUNICATION SYSTEM USING A SPATIALLY SELECTIVE ANTENNA

CROSS-REFERENCE TO RELATED APPLICATIONS

This application claims priority under 35 USC § 119 from European Patent Application No. EP 03 025 719.0, filed Nov. 10, 2003, which is incorporated by reference herein.

FIELD OF THE INVENTION

The invention relates to a device, a system, a method and a computer program to be used in wireless communication systems.

BACKGROUND OF THE INVENTION

Since the introduction of lightweight portable computers (laptops, notebooks), a great deal of attention has been focused on the development of wireless computer networks (Wireless Local Area Network, WLAN). Thanks to standardization in the field of LANs, it is comparatively easy to find systems that will still be upgradable even in a few years' time. Around 70% of all computers connected to networks are compliant with the Institute of Electrical and Electronics Engineers (IEEE) 802.3 (Ethernet) and IEEE 802.5 (Token Ring) standards. Connection is normally over a permanent wireline link. The problems that can occur are the surfacing of mechanical defects (corrosion) after a few years and violations of rules on radiated interference. It is difficult to adapt these networks to cope with changing office conditions. Mobile network nodes are not possible.

The obvious approach is to leave out the cable entirely. This idea is almost as old as the concept of the so-called ALOHA system, which used radio to connect terminals to their processing computers. The newer WLANs work with the most up-to-date radio technology. Data is encrypted and extensive error-protection mechanisms are available. Integrity of data is also guaranteed. Just like wireline LANs, WLANs can be divided into different architectures and performance categories. Many companies offer products for wireless point-to-point connections, but only very few build LANs for multi-point communication. Today wireless networks use spread-spectrum, narrowband microwave or infrared signals for transmission. Because of legal regulations, networks using spread-spectrum and narrowband microwave cannot be operated in most countries unless special authorization has been given. The only exemption of this is operation in a license exempt band, e.g., Industrial, Scientific and Medical (ISM) band, where under a set of given rules for channelization and emitted power operation of radio equipment is allowed, generally. An example of this is the 2.4 GHz band, where the first WLANs have been positioned.

A WLAN need not to be organized centrally, and instead may have a completely distributed architecture with a dynamic allocation of network and network node identifiers. In contrast to a wireline network, WLANs using the same radio channel cannot be separated from one another. Overlapping can occur. Another problem with radio channels is the range restriction. Mobile WLAN nodes and unfavourable propagation characteristics can cause the fragmentation of a network.

As a result of the channel characteristics and the applications for which WLANs are advantageous, WLANs have to be frequently operated in an overlapped fashion. If the radio range of some of the stations in network A should overlap with some of the stations in network B then these members share the transmission medium and its transmission capacity in the area where the overlapping occurs. An overlapping of networks produces two effects: First, the senders in the different WLANs use the same frequency band, thereby increasing the occurrences of interference. As a result, optimal use of the frequency band is no longer possible because not all the stations are able to receive from each other (hidden stations) and therefore can cause interference to each other. Second, a station receives data packets from several WLANs with different WLAN identifiers (LIDs). All received data packets are evaluated, and only those with its own LIDs are accepted. As a result, there is a decrease in the maximum possible data transmission capacity and consequently also the data transmission rate in this area.

In view of this problem, it is thus an object of the invention to improve the performance of wireless communication systems by enhancing the coexistence with other wireless communication systems.

As an example for a WLAN standard, IEEE 802.11 has been designed for use in Industrial, Scientific and Medical (ISM) bands. The Federal Communications Commission (FCC) in the USA prescribed maximum power levels only, band edge interference, and the requirement to use spread spectrum in order to minimize interference with already existing communication systems. It designated the frequency bands 902-928 MHz, 2400-2483.5 MHz and 5725-5850 MHz to these ISM bands.

IEEE 802.11 has defined two Physical Layer (PHY) standards for the 2.4 GHz ISM band: one using the Frequency Hopping Spread Spectrum (FHSS) technique, and one using the Direct Sequence Spread Spectrum (DSSS) technique. An alternative is the specification of an Infrared (IR) physical layer. IEEE 802.11 stations using any-of the three technologies operate at a data rate of 1 Mbit/s (optionally 2 Mbit/s) and at 11 Mbit/s according to standard IEEE 802.11 b. Recently work has been finished on the specification of a 20 Mbit/s PHY at 5 GHz. Target frequencies are those opened by the FCC in 1997 for Unlicensed Information Infrastructure Networks (U-NII).

The protocols of IEEE 802.11 are specified for slowly moving stations, usually indoors but not limited to this, communicating among each other (Ad Hoc Mode) or with stations beyond their direct communication range with the support of an infrastructure (Infrastructure Mode). The communication is packet-oriented.

The IEEE 802.11 MAC protocol provides two types of service: asynchronous and contention-free. The asynchronous type of service is provided by the Distributed Coordination Function (DCF), which implements as the basic access method the Carrier Sense Multiple Access (CSMA) with Collision Avoidance (CA) protocol. The contention-free type of service is provided by the Point Coordination Function (PCF), which basically implements a polling access method. Unlike the DCF, the implementation of the PCF is not mandatory. Furthermore, the PCF itself relies on the asynchronous service provided by the DCF.

The time between two frames is called Interframe Space (IFS). In order to determine whether the medium is free, a station has to use the carrier sense function for a specified IFS. The standard specifies four different IFSs, which represent three different priority levels for the channel-access. The shorter the IFS, the higher the priority. The IFSs are specified as time gaps on the medium and are independent of the channel data rate. Owing to the different characteristics of the different PHY specifications, the IFS time durations are specific for each PHY.

According to the DCF, a station must sense the medium before initiating the transmission of a packet. This mechanism is schematically depicted in FIG. 1.

FIG. 1 schematically depicts the transmissions of frames 101a . . . 101e of five stations 102a . . . 102e, where time proceeds in each row of FIG. 1 from left to right. Because the frames 101a . . . 101e have to be transmitted on the same shared transmission medium, a CSMA/CA protocol is obeyed by each of said stations 102a . . . 102e. The first row of FIG. 1 shows the transmission of a frame 101a by station 102a. As indicated by the vertical arrows 103b . . . 103d in the second, third and fourth row of FIG. 1, data packets arrive at stations 102b, 102c and 102d, so that these stations require to access said shared transmission medium to transmit the arriving data packets. Said three stations 102b, 102c and 102d now start sensing the medium. If the transmission medium is sensed as being busy, the transmission of stations 102b, 102c and 102d is deferred and a backoff process is started for each station, wherein said backoff process is only started after a DCF IFS (DIFS) period 104-1 during which the medium is determined to be idle for the duration of the DIFS. Specifically, each station computes a random number uniformly distributed between zero and a maximum called Contention Window (CW). The random number is multiplied by the slot time, resulting in the backoff interval used to set the backoff timer. In FIG. 1, said backoff intervals 105b . . . 105e are schematically depicted, wherein already elapsed backoff time slots are depicted as white boxes and remaining backoff time slots are depicted as gray boxes. For instance, in the third row of FIG. 1, the backoff interval of station 102c only consists of four time slots, and after the duration of said time slots, station 102c starts the transmission of a frame 101c.

The backoff timers 105b . . . 105e are decremented only when the medium is idle, whereas they are frozen when another station is transmitting. This can be spotted in the second row of FIG. 1. Station 102b has computed a backoff interval 105b consisting of nine time slots. After four elapsed time slots, the backoff timer is frozen due to the transmission of said frame 101c by said station 102c.

Each time the medium becomes idle, the station waits for a DIFS and then periodically decrements the backoff timer. The backoff timer of station 102b thus is only decremented again after the next DIFS period 104-2, where two time slots of the backoff interval 105b of station 102b elapse before the backoff timer is frozen again due to a frame 101d transmitted by station 102d.

As indicated by the last row of FIG. 1, a data packet 103e arrives at station 102e during the transmission of frame 101c, so that station 102e has to start a backoff process as well. As can be seen by comparing the backoff intervals 105b of station 102b and 105e of station 102e after the next DIFS period 104-2, both backoff intervals 105b and 105e have the same length, so that, after the next DIFS period 104-3, three time slots elapse until both stations 102b and 102e concurrently start the transmission of frames 101b and 101e, respectively. If two or more stations start transmission simultaneously, a collision 106 occurs.

Unlike wired networks (e.g. with CSMA/CD in IEEE 802.3), in a wireless environment Collision Detection (CD) is not possible. Hence, a positive acknowledgment ACK 207 (see FIG. 2) is used to notify the sending station 202 that the transmitted frame 205 has been successfully received. The transmission of the ACK 207 is initiated at a time interval equal to the Short IFS (SIFS) 206-3 after the end of the reception of the previous frame 205.

If the acknowledgment is not received in a specified time interval, the station assumes that the transmitted frame was not successfully received, and hence schedules a retransmission and enters the backoff process again. However, to reduce the probability of collisions, after each unsuccessful transmission attempt the Contention Window is doubled until a predefined maximum (CWmax) is reached. After a successful transmission, the Contention Window is reset to $CW_{min}$.

After each frame transmission, a station must execute a new backoff process. Therefore at least one backoff is in between two transmissions of the same station.

In view of the above-mentioned problems, it is thus a further object of the present invention to improve wireless communications systems by reducing the number of collisions.

In radio systems based on medium sensing, a phenomenon known as the hidden-station problem may occur. This problem arises when a station is able to successfully receive frames from two different stations but the two stations cannot receive signals from each other. In this case a station may sense the medium as being idle even if the other one is transmitting. This results in a collision at the receiving station.

To deal with the hidden-station problem, the IEEE 802.11 MAC protocol includes a mechanism based on the exchange of two short control frames, as depicted in FIG. 2: a Request-to-Send (RTS) frame 201 that is sent by a potential transmitter 202 to the receiver 203 and a Clear-to-Send (CTS) frame 204 that is sent by the receiver 203 in response to the received RTS frame 201. Said CTS frame 204 can be sent by the receiver 203 after waiting for a SIFS 206-1. If the CTS frame 204 is not received within a predefined time interval, the RTS frame 201 is retransmitted by executing the backoff algorithm described above. After a successful exchange of the RTS and CTS frames, the data frame 205 can be sent by the transmitter 202 after waiting for a SIFS 206-2. The implementation of the RTS packet 201 is optional, whereas all stations must be able to answer to a RTS frame 201 with the belonging CTS frame 204.

The RTS 201 and CTS 204 frames include a duration field that specifies the time interval necessary to completely transmit the data frame and the related acknowledgment (ACK) 207. This information is used by stations 208, 209 that can hear either the transmitter 202 or the receiver 203 to update their Network Allocation Vector (NAV) 210, 211, a timer that, unlike the backoff timer, is continuously decremented irrespective of the status of the medium. Since stations 208, 209 that can hear either the transmitter 202 or the receiver 203 refrain from transmitting until their NAV 210, 211 has expired, the probability of a collision occurring because of a hidden station 208, 209 is reduced. Of course, the drawback of using the RTS/CTS mechanism is an increased overhead, which may be significant for short data frames.

Furthermore, the RTS/CTS mechanism can be regarded as a way to improve the MAC protocol performance. In fact, when the mechanism is enabled, collisions can obviously occur only during the transmission of the RTS frame 201. Since the RTS frame 201 is usually much shorter than the data frame 205, the waste of bandwidth and time due to the collision is reduced.

However, when using the RTS/CTS mechanism, not only the hidden stations, but all stations in the coverage area of the transmitter 202 and the receiver 203 receiving said RTS frame 201 or CTS frame 204 update their NAVs 210, 211 and refrain from initiating further data transfers. This may result in a waste of bandwidth in particular if stations with spatially selective antennas are deployed in the WLAN system, because the spatially selective transmission and reception of frames naturally requires much less stations to be calmed down when trying to mitigate the hidden station problem.

Prior art document U.S. Pat. No. 6,611,231 B2 discloses methods, apparatuses and systems for use in a wireless routing network. One apparatus, for example, includes an adaptive antenna that is configurable to receive a transmission signal from a transmitter and in response, transmit corresponding multi-beam electromagnetic signals exhibiting a plurality of selectively placed transmission peaks and transmission nulls within a far field region of a coverage area. U.S. Pat. No. 6,611,231 B2 discloses to determine if there is a potential for interference with neighboring nodes prior to transmitting a CTS message, to transmit said CTS message to a targeted node using a narrow beam, if there is no significant potential for interfering with said neighboring nodes, and to transmit said CTS message to said targeted node and one or more of said neighboring modes using one or more beams if there is significant potential for interfering with said neighboring nodes.

This approach requires knowledge on the spatial propagation channels towards said neighboring nodes prior to transmission. Furthermore, said neighboring stations thus are intentionally calmed down by said CTS message to reduce interference, which may result in a waste of bandwidth. U.S. Pat. No. 6,611,231 B2 further discloses to have a pair or more of spatially separated wireless routing devices on a location or node. For example, a separation of about 20 wavelengths may be provided between the antenna arrays. The routing devices can allow a higher percentage of receive time using one of the antenna arrays, and also provide the potential of simultaneous transmit streams from the same approximate site.

In view of the above-mentioned problems, it is thus a further object of the present invention to improve the performance of wireless communication systems by enhancing the use of the available transmission bandwidth.

SUMMARY OF THE INVENTION

It is thus a general object of the present invention to provide a device, a system, a method and a computer program that improves the performance of a wireless communication system.

It is proposed that a device to be used in a wireless communication system with CSMA-based MAC comprises
  means for transmitting at least a first and a second RTS message and at least a first and a second data packet on a transmission medium, and a spatially selective antenna,
  wherein said second RTS message is transmitted after said first RTS message and before said transmission of said first data packet is finished, wherein said at least first and second data packet are transmitted on said transmission medium at least partially in parallel, and
  wherein said device is adapted to use said spatially selective antenna to direct a transmission null towards a first station for the transmission of said second RTS message, to direct a transmission peak towards said first station for the transmission of said first data packet, and to direct a transmission peak towards a second station for the transmission of said second data packet.

Said device may for instance be an access point of a wireless communication system serving a plurality of stations, wherein Medium Access Control (MAC) for said device and said stations that compete for the jointly used transmission medium is performed by a Carrier Sense Multiple Access (CSMA) technique, wherein as well Collision Avoidance (CA) may be performed. In a packet-oriented CSMA system, said device and said stations are only allowed to transmit messages and data packets if the shared transmission medium is sensed to be idle, wherein said transmission medium is understood to be defined by the time, carrier frequency (or sub-carrier frequency in an Orthogonal Frequency Division Multiplex (OFDM) system), spreading code and polarization state of the transmission.

If a first data packet bound for a first station arrives at said device, for instance via the core network said device is connected to, the device transmits a Request to Send (RTS) message which contains an identifier of said first station and a variable that indicates the duration a transfer of said first data packet on said transmission medium would require. This duration may include the time required by said first station to acknowledge the receipt of said first data packet. Said RTS message may be transmitted by said device with an omnidirectional antenna pattern, for instance by a single omnidirectional antenna, or by controlling the spatially selective antenna to create an approximately omnidirectional pattern. The RTS message may then be received by several stations or devices within the coverage area of said access point. With said identifier of said first station being contained in said RTS message, said first station may recognize said identifier and may transmit a Clear to Send (CTS) message. The procedure of transmitting a RTS message in order to receive a CTS message as answer is denoted as "polling". The transmission of the CTS message may take place with a spatially selective antenna or with an omnidirectional antenna. Said CTS message may contain said identifier of said first station and said variable that indicates the duration of said transfer, as well. Other stations or devices receiving said RTS message may recognize said identifier contained in said RTS message and refrain from transmitting messages or data packets for a period of time that corresponds to the duration as indicated by said variable that may be contained in said RTS message. These devices and stations are thus "calmed down" for the transmission of said first data packet and an optional Acknowledgment (ACK) message that may be transmitted after the transmission of said first data packet by said first station. In this way, collisions during the data exchange between said device and said first station with messages or data packets transmitted by other stations on said transmission medium during the transmission of said CTS message (transmitted by said first station on said transmission medium) or first said data packet (transmitted by said device on said transmission medium) may be avoided. When receiving the CTS message, said device may recognize the identifier that may be contained in said CTS message. Said device may deploy its spatially selective antenna to estimate transmission parameters of said first station, for instance the spatial signature or the Direction of Arrival (DOA) of said first station. Said estimated transmission parameters, together with said identification of the first station, may be stored in a routing table for later use. The CTS message may also be received by other stations or devices in the coverage area of said first station, which may recognize the identifier and variable indicating the duration of said transfer and refrain from transmitting messages or data packets for a period of time that corresponds to the duration as indicated by said variable that may be contained in said CTS message, thus avoiding collisions during the data exchange between said device and said first station with stations or devices in the coverage area of said first device.

Upon reception of said CTS message, said device may start with the transmission of said first data packet, wherein said device uses its spatially selective antenna, for instance an adaptive antenna array consisting of several antenna elements that may be controlled in base band depending on the desired antenna array characteristic, to direct a transmission peak towards said first station. Directing a transmission peak towards a station is to be understood as a technique of distributing as much transmission power as possible on one or more propagation paths of a spatial channel between said device with said spatially selective antenna and said first station. Thus the antenna characteristic does not necessarily have to take its maximum in the direction of said first station, as seen from said spatially selective antenna at said device, in particular if the Line-of-Sight (LOS) between said device and said first station is blocked or otherwise heavily attenuated. Distributing power on the respective propagation paths is generally considered as forming "beams" towards the angles under which said propagation paths arrive or depart from said spatially selective antenna (in azimuth and/or elevation). In the sequel, the term "beam" will also be used in a more general sense to describe the antenna characteristic of said spatially selective antenna used to transmit a data packet to a station, wherein said antenna characteristic may of course comprise a plurality of beams, each for power distribution on a single propagation path in the spatial channel between said device and a station.

In directing a transmission peak towards a station, the spatial channels between said device and further stations, to which signals shall be transmitted by said spatially selective antenna at least partially in parallel to the transmission of said first data packet bound for said first station, might as well be taken into account. In particular if several data packets have to be transmitted at least partially in parallel, i.e. if spatial multiplexing takes place, it is not always possible to distribute transmission power on all the propagation paths between said device and said first station, because propagation paths between further stations and said device may overlap with the propagation paths of said first device. Overlapping paths then should not be used at all, or a different set of stations the data packets of which are to be spatially multiplexed should be chosen by applying spatial scheduling techniques, which may be based on the information contained in said routing table.

Directing a transmission peak towards said first station with a spatially selective antenna when transmitting said first data packet ensures that a substantial part of the transmission energy is concentrated towards said first station, so that, for a constant overall transmission power, the Signal-to-Noise-and-Interference Ratio (SNIR) of the signals received at said first station is considerably increased as compared to the transmission with an omnidirectional antenna. Furthermore, less interference is caused at devices or stations which are not positioned in the elongation of the beams that may be formed by the spatially selective antenna to illuminate the propagation paths in the spatial channel between said device and said first station. Increasing the SNIR at said first station and reducing the interference caused at other stations of the wireless communication system (and also neighboring communication systems operating in the same frequency range) is only one aspect of the device according to the present invention.

The increased SNIR may equally well be exploited in a way that less error protection may be admitted to the transmitted signals, thus increasing the data rate of the signals transmitted in said first data packet, or higher modulation alphabets may be used, which, for constant symbol rate, as well increases the data rate. For instance, instead of a PHY mode with Binary Phase Shift Keying (BPSK), a PHY mode with Quaternary Phase Shift Keying (QPSK) could be applied as modulation technique. When QPSK is used instead of BPSK, the duration of a transmission of a data packet is effectively halved, i.e., the same amount of data can be transmitted in half of the time. When no further data is sent in the remaining half of the original BPSK transmission time, it is easily seen that the interference power that is imposed on other stations in the elongation of said beams formed by said spatially selective antenna has been reduced in the time domain. Alternatively, the remaining half of the original BPSK transmission time can be used to transmit a further QPSK-modulated data packet, thus doubling the throughput. The spatially selective antenna thus can be deployed to either decrease the interference or to increase the throughput in the wireless communication system, so that the use of the available transmission bandwidth is enhanced.

In state-of-the-art wireless communication systems, said device uses a timer that indicates when said transmission medium will no longer be busy, i.e. occupied by the transmission of said first data packet and an optional ACK message transmitted by said first station. In an IEEE 802.11 system, this timer may be identified as the Network Allocation Vector (NAV) of an access point. According to the present invention, said device includes information on said NAV in said RTS messages to calm down the stations that receive said RTS message and the CTS message transmitted by said first station that contains the same information, but does not observe the NAV himself, so that further data packet transmissions can take place concurrently to an already established data packet transmission between said device and said first station. The prerequisite for this concurrent transmission of data packets, which is controlled and performed by said device, is a spatially selective antenna, that allows for spatial multiplexing of several data packets on the same transmission medium. It is advantageous that the stations to which data packets are transmitted to in parallel are spatially separable, i.e. the respective spatial channels between said device and said stations have to be approximately orthogonal to an extent that allows proper signal reception at each station without receiving too much of the data packets that are intended to be received at the remaining stations.

By transmitting a second RTS message, which contains an identifier of a second station and a variable indicating the duration a transfer of a second data packet on said transmission medium would require, said device prepares the transmission of a second data packet, so that the transmission of said first data packet and said second data packet may take place at least partially in parallel on the same transmission medium. Both data packets thus can be transmitted at the same time, on the same carrier frequency (or frequency subcarrier in an Orthogonal Frequency Division Multiplex (OFDM) system), with the same spreading code, and with the same polarization. In order not to disturb the already set up transmission of said first data packet between said device and said first station, said second RTS message is transmitted by said spatially selective antenna with a transmission null directed towards said first station. Directing a transmission null towards a station is understood here in a way that as few transmission power as possible is to be distributed on the propagation paths in the spatial channel between said device and said station. When several transmission peaks or nulls have to be formed in parallel due to spatial multiplexing of more than one station, it might not always be possible to force the power that is received at a station that is to be nulled exactly to zero. It often is sufficient to reduce the amount of transmission power that is received at a station that is to be nulled below the noise or interference level.

Whereas the first station now does not receive said second RTS message, further stations such as a second station may do. Based on said identifier and said variable indicating the duration of a transfer of said second data packet, said second station may notice that it is no longer required to refrain from transmitting, because it has been directly polled by said device via a said second RTS message. The second station may thus respond to said second RTS message with a CTS message, into which said identification and said variable may have been copied. Upon reception of said CTS message, said device may start the transmission of a second data packet, wherein said spatially selective antenna is used to direct a transmission peak towards said second station.

This procedure may be repeated with a third RTS and a third data packet being transmitted to a third station, respectively. The polling of stations by sending RTS messages and waiting for CTS messages before transmission of data packets by said device is optional. If the transmission parameters for the stations to which data packets shall be transmitted are known, possibly from a routing table, said device may directly start with the transmission of data packets to stations.

When transmitting said second data packet to said second station concurrently to the transmission of said first data packet to said first station, said device may advantageously direct a transmission null towards said first station to reduce interference. Alternatively, spatial scheduling techniques based on the transmission parameters of said first and second station, e.g. the DOAs of both stations, are applied to decide if concurrent data transmission to both stations is possible without explicitly having to form transmission nulls towards the respective other station.

In the above-described scenario with two data packets being transmitted at least partially in parallel, it may as well be possible to wait with the transmission of the first data packet until the CTS from the second station is received, and to start the transmission of the first and second, data packet jointly. This has the advantage that, if the transmission parameters of the second station are estimated from the received CTS message that is transmitted by said second station, the transmission parameters of said first and second station can be considered when transmitting said first and second data packets, i.e. a peak is directed towards said first station and a null towards said second station for the beam that is formed for the transmission of said first data packet, and a peak is directed towards said second station and a null is directed to said first station for the beam that is formed for the transmission of said second data packet.

According to this approach, by sending said first RTS message and receiving said first CTS message, said access point has successfully reserved the transmission medium that is shared among a plurality of stations and devices for the duration that is specified in the first RTS message and may have been copied into the first CTS message by said first station. In effect, said access point now uses the reserved transmission period to poll a further station with a second RTS message and to await the reception of a second CTS message originating from said polled second station. The remainder of the reserved transmission period then is used for the transmission of data packets to both said first station and said second station under the use of spatial multiplex. Performing a second polling procedure for the second station is possible because the RTS/CTS messages are much shorter than the data packets, and because the deployment of a spatially selective antenna allows to increase the SNIR at each receiving station, so that a higher PHY mode can be used (for instance, QPSK-modulation instead of BPSK-modulation) and, correspondingly, less time for the transmission of the same amount of data is required.

However, if the transmission of said first data packet has already begun when the CTS message transmitted from said second station is received at said device, it might as well be possible to re-shape the beam that is used for the transmission of said first data packet so that the transmission parameters estimated from said received CTS message of said second station can be considered in said beam as well.

In transmitting said CTS message, said second station may advantageously use a spatially selective antenna to direct a transmission peak towards said device as well, so that an already set up data exchange between said device and said first station is disturbed only in a minimum way. The transmission parameters required for directing a transmission peak towards said device by said second station may be estimated from said received second RTS message.

It may be possible that there exist stations with a spatially selective antenna and stations with an omnidirectional antenna in the same wireless communication system. It may further be possible that for the initiation of data transfer, said device uses RTS/CTS-polling for said first station, and no RTS/CTS polling for the second station, or vice versa.

This approach thus represents an effective way of enhancing the use of the available transmission bandwidth in a wireless communication system.

It is further proposed that a device to be used in a wireless communication system with CSMA-based MAC, comprises means for transmitting one RTS message and at least a first and a second data packet on a transmission medium, and a spatially selective antenna, wherein said one RTS message contains information on at least a first and a second station to which said at least first and second data packet are to be transmitted, respectively, wherein said device is adapted to use said spatially selective antenna to direct a transmission peak towards said first station and a transmission null towards said second station for the transmission of said first data packet and a transmission peak towards said second station and a transmission null towards said first station for the transmission of said second data packet, and wherein said transmission of said first data packet takes place at least partially in parallel to the transmission of said second data packet.

Said device, for instance an access point of said wireless communication system that serves a plurality of stations, polls said first and second station with one single RTS message that contains identifiers of the first and second station and variables that indicate how long the transmission of said first and second data packet (optionally including the duration of an ACK message transmitted by said first and second stations in reply to said first and second data packets, respectively) will occupy the jointly used transmission medium. In an IEEE 802.11 system, this may for instance be achieved by modifying the single-cast/multi-cast addressing. Said polling is advantageously performed with an omnidirectional antenna characteristic, so that all stations within the coverage area of said device are informed of the future data transmission and refrain from transmitting messages and data packets by themselves. The first and second station, upon reception of said one RTS message, may recognize said identifiers, and copy their according identifier and variable into first and second CTS messages, which are transmitted by said first and second station, respectively. Upon reception of said CTS messages, said device may start the transmission of a first data packet to said first station, i.e. by directing a transmission peak towards said first station, and the transmission of a second data packet to said second station, i.e. by directing a transmission peak towards said second station, so that both data packets are spatially multiplexed on the jointly used transmission medium. It is advantageous to further transmit transmission nulls towards the respective other station during the transmission of said data packets. The transmission parameters of said first and second station that are required to direct the transmission peaks may be estimated by said device during the reception of said respective CTS messages, or be known in advance. Other devices and stations receiving said CTS messages notice that data transmission will take place and do not transmit packets or messages at least during the time that is indicated by said variable in said CTS messages. The above-described technique can be performed for three or more data packets that are at least partially transmitted in parallel on said jointly used transmission medium to respective stations, as well, by including further identifiers and variables into said one RTS message.

Apparently, this approach allows for the concurrent transmission of several data packets on the shared transmission medium and thus allows for an enhanced use of the available transmission bandwidth.

According to an embodiment of a device according to the present invention, the device is further adapted to use said spatially selective antenna to direct a transmission null towards said second station for the transmission of said first data packet, and to direct a transmission null towards said first station for the transmission of said second data packet.

Directing a transmission peak towards the station a data packet is to be transmitted to and transmission nulls towards all other known stations to which data packets are transmitted concurrently vastly reduces the interference between the concurrent data transmissions and further increases the SNIR at each station that is receiving a data packet.

It is further proposed that a device to be used in a wireless communication system with CSMA-based MAC, comprises means for transmitting a first RTS message and a data packet on a transmission medium, means for transmitting a NULL message, which indicates that said transmission medium is idle, and a spatially selective antenna, wherein said NULL message is transmitted after the transmission of said first RTS message and before the transmission of said data packet is finished, and wherein said device is adapted to use said spatially selective antenna to direct a transmission null towards a first station for said transmission of said NULL message and to direct a transmission peak towards said first station for said transmission of said data packet.

If said device is an access point of a wireless communication system, said device uses said first RTS message, which includes an identifier of a first station and a variable indicating the duration of the transmission of a data packet, in order to poll a first station. Said RTS message is advantageously transmitted with an omnidirectional antenna characteristic. Upon reception, said first station may copy said identifier and said variable into a CTS message and transmit said CTS message. In this way, other stations and devices in the coverage area of said device and said first station recognize how long the jointly used transmission medium will be busy with the transmission of said data packet between said device and said first station and refrain from transmitting messages and data packets during the time indicated by said variable. Upon reception of said CTS message, in a state-of-the-art system said device would start the transmission of said data packet, and the medium would be blocked by said transmission. However, by transmitting a NULL message, wherein said spatially selective antenna is used to direct a transmission null towards said first station for the transmission of said NULL message, the stations and devices that receive said NULL message are informed that the transmission medium is idle. Said first station is, of course, excluded from said resetting operation by directing a transmission null towards said first station for the transmission of said NULL message. For the transmission of said data packet to said first station, said device directs a transmission peak towards said first station, in order to increase the SNIR at said first station and in order to cause as few interference power at other devices and stations in said wireless communication system (and neighboring communication systems).

By the spatially selective transmission of said NULL message, excluding said first station, all devices and stations that received said RTS or CTS messages and said NULL message are now enabled to transmit messages and data packets on their own, so that parallel transmission of data packets can take place and the transmission medium is more effectively used. Collisions between said additional transmissions and said transmission of said data packet between said device and said first data packet are mitigated by the transmission peak directed towards said first station by said device to enhance its SNIR, and may be further mitigated if the devices or stations that start parallel data or message transmissions use spatially selective antennas as well and direct transmission nulls towards said first station for their transmissions. The transmission parameters of said first station may be estimated by said devices and stations during the reception of said CTS message that is transmitted by said first station, or may be known in advance.

Said NULL message may be transmitted before the transmission of said data packet, or in parallel to the transmission of said data packet, so that a longer time duration for the transmission of the data packet is available, which may be used to increase the packet length or data rate of the data packet.

This approach thus represents an effective way of reducing the duration of periods during which devices and stations are calmed down by a spatially selective antenna and thus enhances the use of the available transmission bandwidth in a wireless communication system.

It is further proposed that a device to be used in a wireless communication system with CSMA-based MAC comprises means for transmitting a first RTS message and/or data packet on a transmission medium, means for setting a timer that indicates when said transmission medium will no longer be busy, and a spatially selective antenna, wherein said timer is set to its minimum value, wherein said device is adapted to use said spatially selective antenna to direct a transmission peak towards a first station for said transmission of said data packet, and wherein said first data packet contains information on the duration of further data packet transmissions for said first station.

Said timer is set to its minimum value, so that only a short data packet can be transmitted. By sending the RTS message, advantageously with an omnidirectional antenna characteristic, all devices and stations in the coverage area of said device are calmed down, but only for a minimum duration. After the reception of a CTS message from the station that has been polled by said device with said first RTS message, said device may start the transmission of said first data packet, wherein a spatially selective antenna is used to direct a transmission peak towards said first station. The SNIR is thus increased at said first station, and less interference power is caused at other stations and devices that are not positioned in the elongation of the beam that is radiated by said spatially selective antenna.

Said first data packet, which is received by said first station, may advantageously contain an identifier of said first station and a variable indicating the duration of transfers of further data packets that said device intends to transmit to said first station. Only the devices and stations, including said first station, that are positioned in the elongation of the beam that is radiated by said spatially selective antenna during the transmission of said first packet receive this information, and only said devices and stations excluding said first station are calmed down by this information, i.e. refrain from further message or data packet transmission during the period as indicated in said first data packet. Said first station, in contrast, recognizes that said device uses said first data packet to poll said first station, and may respond to said polling with an ACK or CTS message, so that said device may transmit said further data packets to said first station, wherein advantageously a transmission peak is directed towards said first station to keep the overall interference power low.

Choosing the minimum possible timer value in said first RTS message thus calms the devices and stations in the coverage area of said device only down for the minimum possible time, so that further data transmission can be initiated and performed during the actual data transmission between said device and said first station. Said data transmission between said device and said first station can be extended by information contained in said first data packet, which calms down only those stations that are positioned in the elongation of the beam that is radiated by said device for the transmission of said first data packet.

It may be advantageous that the transmission of an acknowledgment can be postponed in the present approach, so that no acknowledgment has to be transmitted by the first station at least after the reception of the first data packet. The time interval after which said device awaits an acknowledgment from the first station may be increased. It thus can be avoided that the first station transmits an acknowledgment in omnidirectional mode and causes interference to other stations or devices.

This approach thus represents an effective way of reducing both the number of stations and devices that are calmed down and the duration of the respective calming down periods.

According to an embodiment of a device according to the present invention, said first RTS message is transmitted with an omnidirectional antenna characteristic.

Said first RTS message is intended to calm down the stations and devices that are in the coverage area of said first device, which is of particular importance for the collision-free exchange of further messages and data packets between said device and said first station. If this data exchange has been securely established, the calming down of stations or devices that received that first RTS message may be reset by direct polling with a further RTS message by said device or by the transmission of a NULL message, as indicated above.

The transmission of said first RTS message is advantageously performed with an omnidirectional antenna characteristic, either by using a spatially selective antenna and controlling the spatially selective antenna in a way that an approximately omnidirectional antenna characteristic is achieved, or by using an omnidirectional antenna that is either part of said spatially selective antenna or is provided separately. An omnidirectional antenna characteristic is understood to be an antenna characteristic that allows to transmit a signal into all azimuth directions with a sufficient power level. If a spatially selective antenna is not capable of providing such a characteristic, omnidirectional radiation may be achieved by repeatedly transmitting the same signal and each time changing the direction of the transmission peak. For instance, if a sectored antenna with three controllable sectors is used, a signal has to be transmitted into the three sectors of said sectored antenna successively.

The transmission of said RTS message with an omnidirectional antenna characteristic supports the estimation of transmission parameters of said device for stations or devices that receive said RTS message and use a spatially selective antenna themselves.

According to an embodiment of a device according to the present invention, the device further comprises means for receiving CTS messages that are transmitted by said stations in reply to said RTS messages and/or ACK messages that are transmitted by said stations in reply to said data packets, wherein said device is adapted to use said spatially selective antenna to direct according reception peaks and reception nulls towards said transmitting stations so that at least two messages that are transmitted by at least two of said stations at least partially in parallel on said transmission medium, respectively, can be properly received by said device.

Said stations may respond to RTS-polling of said device with a CTS message, which may either be transmitted with a spatially selective antenna or with an omnidirectional antenna. An identifier of a station and a variable that indicates the duration of a future data packet transmission between said device and the station as identified by said identifier, which both are contained in said RTS message, may have been copied into said CTS message before said CTS message is transmitted by said station. Similar to the RTS message, said CTS message serves the purpose of calming down the devices and stations that receive said RTS or CTS message. ACK messages are transmitted by stations to acknowledge proper reception of data packets from said device, which may as well be performed with a spatially selective antenna or an omnidirectional antenna. If two CTS messages are transmitted by a respective first and second station at least partially in parallel on said jointly used transmission medium, said device deploys its spatially selective antenna to direct a reception peak towards said first station and a reception null towards said second station for the reception of the CTS message that has been transmitted by said first station, and vice versa for the reception of the CTS message that has been transmitted by said second station. Whereas the forming of transmission peaks and nulls is an active process, where, for instance in the case of an adaptive antenna array with controllable weights for each antenna element, weights are adjusted to achieve an antenna characteristic with the desired peaks and nulls and multiplied with the transmission signal prior to transmission, forming reception peaks and nulls is a passive process wherein the receive signals at each antenna element are multiplied with an adjusted weight in order to perform spatial filtering of the received signals. In both cases, the transmission parameters of each station, for instance the DOA of the station as seen from an adaptive antenna array at said device, have to been known in order to compute the weights that represent the transmission/reception antenna characteristic. In the reception case, the signals received at all antenna elements may be processed to estimate said transmission parameters, and after said estimation, the weights may be computed under joint or separated consideration of the estimated transmission parameters of all stations that contributed to that receive signals by transmitting signals. The received signals at the antenna elements may then be multiplied with the weights that have been computed for each station, so that the signals as transmitted by the respective stations can be reproduced.

According to an embodiment of a device according to the present invention, the device further comprises means for estimating transmission parameters that are required to direct transmission and/or reception peaks or nulls towards said stations, wherein said transmission parameters are at least partially estimated from receive signals at said spatially selective antenna that originate at least partially from said CTS and/or ACK messages that are transmitted by said stations, or from RTS messages and data packets that have been transmitted by said stations before.

Estimation of transmission parameters is based on the signals that are received at the antenna of said device, wherein said signals are the CTS and/or ACK messages that are transmitted by said stations and propagate through the radio channel, wherein propagation effects such as fading and shadowing attenuate and distort the originally transmitted messages. Whereas an attenuation factor is comparatively easily detected by comparison of the transmission power level of a carrier or sub-carrier (if known) and the corresponding receive power level, spatial information is more difficult to obtain from a received signal. A coarse estimation of the DOA may for instance be achieved by switching through the sectors of a sectored antenna with controllable sectors or a switched beam antenna. For adaptive antenna arrays, a couple of high resolution parameter estimation techniques have been developed, for instance the subspace-based MUSIC and ESPRIT algorithms or the maximum-likelihood-based SAGE algorithm.

Transmission parameter estimation can in general be performed in a blind or non-blind fashion. Blind techniques do not require a training sequence, i.e. it is not required that a part of the transmitted signal is known at the receiver before its actual reception. In contrast, non-blind algorithms require such knowledge. In an OFDM system, it is common practice to transmit so-called pilot tones on the sub-carriers of the OFDM system that are known at the receiver and, under certain circumstances, allow to estimate the spatial channel between each station and each antenna element of an adaptive antenna array deployed at said device and that for each frequency sub-carrier. It mainly depends on the technique according to which the antenna characteristic is adjusted whether the complete spatial channels are required or whether a DOA, possibly with a corresponding power level, is sufficient.

It is further proposed that a device to be used in a wireless communication system with CSMA-based MAC, comprises means for transmitting at least a first RTS message and/or at least one data packet on a transmission medium, means for setting a timer that indicates when said transmission medium will no longer be busy, and a spatially selective antenna, wherein said device is adapted to use said spatially selective antenna to direct a transmission peak or a transmission null towards at least a first station for the transmission of said at least first RTS message and for the transmission of said at least one data packet, and wherein said device is adapted to transmit said at least first RTS message and/or said at least one data packet on said transmission medium only after said timer has expired.

Said device may for instance be an access point or station in a wireless communication system. Said device may have been calmed down, i.e. it has set an internal timer that indicates when said transmission medium will no longer be busy with message or packet transmissions of other stations. In an IEEE 802.11 system, said timer may be the NAV of said device. The calming down may have been caused by the reception of an RTS message or CTS message which may contain an identifier of a station or device and a variable that indicates the duration of a future data transmission that involves at least said station as identified by said identifier.

After said timer, which may for instance be a NAV timer, has expired, said device recognizes that said transmission medium is idle and may start to direct transmission peaks or nulls towards stations for its data or message transmissions. Before that transmission is started, the medium may have to be sensed to be idle for a certain IFS, and after said IFS, a back-off timer may have to be awaited. By the directive transmission of said device, less other stations receive the transmitted signals, and, correspondingly, less collisions occur. Collisions thus are spatially avoided, where in a state-of-the-art system, only temporal avoidance is necessary due to the use of omnidirectional antennas in such prior-art-systems. The transmissions of said device may either be initiated with an RTS/CTS procedure or may directly start with the transmission of a data packet. It is advantageous that the transmission parameters that are required to direct according transmission peaks and nulls towards stations are known at said device, especially if no RTS/CTS procedure is performed. However, observing the expiration of said timer before transmission may help to avoid collisions with already set up data packet exchanges between other stations and devices.

This approach is advantageous in that less stations are calmed down and less interference is caused to other stations, so that the use of the available transmission bandwidth is enhanced, collisions are avoided and coexistence with other wireless communication systems is enhanced. It is particularly advantageous that said device further comprises means for determining the duration of an idle period of said transmission medium, wherein said device is allowed to start a transmission on said transmission medium only if the duration of said idle period is larger than a first IFS, which is chosen smaller than a second IFS that has to be awaited in said wireless communication system by default in order to prioritize medium access of said device. Said device for instance may obey its own NAV timer, but after the NAV timer has expired, may not have to wait for a duration DIFS during which the medium is sensed idle before it can start a transmission, but only for a shorter duration, e.g. a PIFS, so that its medium access is prioritized.

If is further proposed that a device to be used in a wireless communication system with CSMA-based MAC, comprises means for transmitting at least a first RTS message and/or at least one data packet on a transmission medium, means for setting a timer that indicates when said transmission medium will no longer be busy, and a spatially selective antenna, wherein said device is adapted to use said spatially selective antenna to direct a transmission peak or a transmission null towards at least a first station for the transmission of said at least first RTS message and for the transmission of said at least one data packet, and wherein said device is adapted to transmit said at least first RTS message and/or said at least one data packet on said transmission medium although said timer indicates that said transmission medium is still busy.

Said device may for instance be an access point or station in a wireless communication system. Said device may have been calmed down, i.e. it has set an internal timer that indicates when said transmission medium will no longer be busy with message or packet transmissions of other stations. In an IEEE 802.11 system, said timer may be the NAV of said device. The calming down may have been caused by the reception of an RTS message or CTS message which may contain an identifier of a station or device and a variable that indicates the duration of a future data transmission that involves at least said station as identified by said identifier. In a state-of-the-art system, where devices are equipped with omnidirectional antennas, ignoring said timer and transmitting messages or data packets is most likely to cause a collision with data transmissions that already take place on the jointly used transmission medium, as it is indicated by said timer. However, due to the use of a spatially selective antenna, said device may direct transmission peaks or nulls towards stations for its data or message transmissions without disturbing other data transmissions due to the spatially selective transmission and the reduced amount of caused interference power. For instance, a transmission peak may be directed to a station with which said device starts a data packet transmission, or a transmission null may be directed to a station that already performs data packet exchange with a different device or station. The transmissions of said device may either be initiated with an RTS/CTS procedure or may directly start with the transmission of a data packet. It is advantageous that the transmission parameters that are required to direct according transmission peaks and nulls towards stations are known at said device.

This approach is apparently advantageous in that less stations are calmed down and less interference is caused to other stations, so that the use of the available transmission bandwidth is enhanced, collisions are spatially avoided and coexistence with other wireless communication systems is enhanced.

According to an embodiment of a device according to the present invention, at least a second data packet is transmitted at least partially in parallel to said transmission of said at least one data packet, and said device is adapted to use said spatially selective antenna to direct a transmission peak towards said first station and a transmission null towards a second station for the transmission of said at least one data packet, and to direct a transmission peak towards said second station and a transmission null towards said first station for the transmission of said at least second data packet.

The concurrent transmission of several data packets to different stations on the same transmission medium in the sense of spatial multiplexing is advantageous with respect to the increased throughput that then is possible on the shared transmission medium. Interference power is only emitted by said device in directions in which beams are formed by said spatially selective antenna in order to direct transmission peaks towards said desired stations.

According to an embodiment of a device according to the present invention, the device further comprises means for receiving CTS messages that are transmitted by said stations in reply to said RTS messages and/or ACK messages that are transmitted by said stations in reply to said data packets, wherein said device is adapted to use said spatially selective antenna to direct according reception peaks and reception nulls towards said transmitting stations so that at least two messages that are transmitted by at least two of said stations at least partially in parallel on said transmission medium, respectively, can be properly received by said device.

Said stations may respond to RTS-polling of said device with a CTS message, which may either be transmitted with a spatially selective antenna or with an omnidirectional antenna. An identifier of a station and a variable that indicates the duration of a future data packet transmission between said device and the station as identified by said identifier, which both may be contained in said RTS message, may have been copied into said CTS message before said CTS message is transmitted by said station. Similar to the RTS message, said CTS message serves the purpose of calming down the devices and stations that receive said RTS or CTS message. ACK messages are transmitted by stations to acknowledge proper reception of data packets from said device, which may as well be performed with a spatially selective antenna or an omnidirectional antenna. If two CTS messages are transmitted by a respective first and second station at least partially in parallel on said jointly used transmission medium, said device deploys its spatially selective antenna to direct a reception peak towards said first station and a reception null towards said second station for the reception of the CTS message that has been transmitted by said first station, and vice versa for the reception of the CTS message that has been transmitted by said first station.

According to an embodiment of a devices according to the present invention, the device further comprises a routing table, wherein said routing table comprises transmission parameters of said at least first station, and wherein said transmission parameters are continuously updated by said device.

An entry in said routing table that corresponds to a station may for instance be updated each time a CTS message or ACK of said station is received at said device by processing the received signal. The transmission parameters in said routing table may as well be averaged over a pre-defined time period or over a fixed number of updates to increase the accuracy of the transmission parameters. Alternatively, updates of said transmission parameters may be transmitted to said device from other stations or, if said device is an access point, be received via the core network.

According to an embodiment of a devices according to the present invention, said transmission parameters comprise information on the spatial propagation channel between said device and said at least first station, and/or on the noise and interference conditions at said at least first station, and/or on the best PHY mode that can be used with said at least first station.

Said transmission parameters may represent parameters such as the Direction-of-Arrival (DOA) of the main or a couple of propagation paths of a spatial channel between a station and said device, the corresponding attenuations, Doppler shifts, path delays, or the spatial signature of a station. Furthermore, relative or absolute noise and interference levels encountered at a station may be available. Advantageously this information is combined into a decision which Physical Mode (PHY mode) is best used when transmitting a data packet to a station, wherein said PHY mode summarizes parameters such as the symbol alphabet used in modulation, as for instance Binary Phase Shift Keying (BPSK) or Quaternary Phase Shift Keying (QPSK), or the code rate applied in channel coding, as for instance convolutional or turbo coding.

According to an embodiment of a device according to the present invention, said device is adapted to use said transmission parameters to schedule the stations to which RTS messages and/or data packets are transmitted in parallel.

Based on said transmission parameters, said device may decide which stations are suited for spatial multiplexing. For instance, the DOAs of stations may be considered, and it may be demanded that there has to be a minimum angular separation between the DOAs of said respective stations if data packets shall be concurrently transmitted to said station on said jointly used transmission medium. More concise decision algorithms may be imagined, for example checking the orthogonality of spatial signatures of stations. The PHY mode and QoS requirements of said stations may also be considered in the scheduling process.

According to an embodiment of a device according to the present invention, the device further comprises means for transmitting and/or receiving signals to and/or from stations that use spatially selective antennas.

If said stations are equipped with spatially selective antennas as well, the transmission and reception means of said device may have to be changed to achieve optimum throughput on the resulting Multiple-Input-Multiple-Output (MIMO) links between said device and said stations. Said means in said device may for instance be adapted to allow for the application of the Bell Laboratories Layered Space-Time Architecture (BLAST) or similar spatial multiplexing techniques that allow for the concurrent transmission of several data packets between said device and one single station.

According to an embodiment of a devices according to the present invention, the device further comprises means for determining the duration of an idle period of said transmission medium, wherein said device is allowed to start a transmission on said transmission medium only if the duration of said idle period is larger than a first IFS, which is chosen smaller than a second IFS that has to be awaited in said wireless communication system by default in order to prioritize medium access of said device.

Said device may for instance be an access point of said wireless communication system that serves a plurality of stations. It may be part of a CSMA protocol to define a second Inter-Frame Space (IFS) that has to be obeyed by all devices and stations within said wireless communication system. Said determination of the duration of an idle period of said shared transmission medium is basically independent from the use of timers that are set in said device or stations to indicate when the transmission medium will no longer be busy (idle). Whereas said timers represent an virtual carrier-sense mechanism, that only predicts future traffic on said shared transmission medium based on duration information that is announced in RTS/CTS frames as explained above, said determination of the duration of an idle period of said transmission medium can be considered as physical carrier-sense mechanism. It may be preferred that said determination of said idle period of said transmission medium is only performed by said device when said timer in said device has expired and thus indicates that the transmission medium is idle. Thus after the virtual carrier-sense mechanism has indicated the medium to be idle, the physical carrier-sense mechanism actually checks for this idle state of the transmission medium.

Said device is equipped with a spatially selective antenna array and thus capable of spatial multiplexing techniques. It is thus only natural to grant said device priority when accessing the transmission medium that has to be shared among said device, possibly further devices and said stations. According to the present invention, this is achieved by allowing said device to start a transmission on said transmission medium already if the transmission medium is physically sensed to be idle for a first IFS, which is smaller than said second IFS that has to be obeyed by said stations and possibly by further devices in said wireless communication system. Said device then simply does not have to wait for the second IFS when willing to access said medium with a transmission, but only for the shorter first IFS. When starting the transmission, said stations will be either calmed down, if RTS/CTS messages are transmitted, or will sense after the duration of said first IFS that the medium is no longer idle, so that an idle period of the length of the (standard) second IFS will only be encountered if said device refrains from medium access. For instance, if said wireless communication system is a IEEE 802.11 system or a derivative thereof, said second IFS may be the Distributed Coordination Function IFS (DIFS), and said first IFS may be the Point Coordination Function IFS (PIFS). As a further extension of this concept, it may be preferred that said device does not nave to perform a back-off procedure at all. That is, when the medium is sensed to be idle for a duration longer than the first IFS, said device may instantaneously start a transmission irrespective of the state of its back-off timer.

According to an embodiment of a device according to the present invention, said spatially selective antenna is a sectored antenna with dynamically activated sectors, or a switched beam antenna, or an adaptive antenna array with controllable weights.

In a sectored antenna with controllable sectors, it can be dynamically chosen which sector of said antenna transmits the transmission signal. Such an antenna may for instance comprise six sectors of an aperture angle of 60°, or similar. In a switched beam antenna, the maximum of the antenna characteristic can be dynamically switched towards different angles. The width of the beam for each angle position may substantially differ. A switched beam antenna may for instance be realized with an antenna array, i.e. a group of single antenna elements, wherein the antenna elements are controlled by a phase delay network that delays the signal that is to be transmitted from each respective antenna element by pre-defined, element-specific factors to achieve the desired antenna characteristic. This is possible for a limited number of antenna characteristics, each with its own main looking-direction.

An adaptive antenna array represents a group of antenna elements, wherein each antenna element is fed with an element-specific transmission signal that is obtained from the multiplication of a complex-valued weight factor with the signal that is to be transmitted by the adaptive antenna array. This multiplication may be performed in base-band, in an intermediate frequency range or at the radio frequency. The weight factors for the antenna elements are usually combined in a complex-valued weight vector, that represents the antenna characteristic or beam that is created by the antenna when a transmission signal is projected onto the single antenna elements via multiplication with said weight vector. Exploiting the superposition principle, several transmission signals, for instance bound for different stations, may be projected onto the antenna elements with respective weight vectors and then concurrently transmitted by the adaptive antenna array. The term adaptive refers to the ability to electronically steer the beam of the antenna array by simply changing the weight vector, for instance based on a change in the DOA of a station to which a signal is transmitted. In the reception case, the signals received at the single antenna elements are multiplied with the weight factors within said weight vectors and then summed to obtain the spatially filtered receive signal.

The beam-width of an antenna array is mainly influenced by the number of antenna elements and by the spacing between the antenna elements. The beam-width decreases with increasing numbers of elements and with increasing distance between the antenna elements. If the distance between the antenna elements increases, the signals received at the single antenna elements become more and more uncorrelated, i.e. they do no longer only differ in phase but also show different amplitude due to the experience of different fading processes. With uncorrelated signals, diversity techniques are applicable, as for instance micro- or macro-diversity. In the transmission case, the antenna characteristic will then no longer appear like a beam. However, it is still possible to direct a transmission peak towards a station, i.e. to distribute as much transmission power as possible on the propagation paths between said device and a station. For instance, a spatial channel between an antenna array and a station, which is time-invariant and shows frequency-flat fading, is characterized by a vector that contains a complex-valued transmission factor for the channel between each antenna element of the antenna array and the single antenna of said station. To direct a transmission peak towards said station, a weight vector that simply contains the conjugate-complex transmission factors as weight factors can be used. Alternatively, techniques such as Space-Time Codes can be deployed to exploit the diversity of the wireless channel.

According to an embodiment of a device according to the present invention, said spatially selective antenna is a distributed antenna consisting of the antenna elements of at least two devices of said wireless communication system, and said devices are access points or stations of said wireless communication system that are connected by means of a wired or wireless link so that signals transmitted from and/or received at the respective antenna elements can be jointly processed.

Said device may for instance be an access point or a station of said wireless communication system. Said access point may only be equipped with a standard omnidirectional antenna. However, it may be interconnected with stations or other access points, so that said omnidirectional antenna and the antennas of said stations or access points can be combined into an antenna array. Said stations or other access points may either be equipped with omnidirectional antennas or with all other kinds of antennas, such as sectored antennas, switched beam antennas or antenna arrays. However, said device has to provide means to operate said distributed antenna for signal transmission and reception. The use of antenna elements that are distributed over the deployment area of the wireless communication system allows to exploit macro-diversity techniques, that exploit that signals transmitted by a station arrive at the distributed antenna elements rather uncorrelated, because they propagated on different propagation paths and thus experienced different fading. The interconnection of the devices the antennas of which are combined into a distributed antenna may be achieved by a wireless link, which is particularly advantageous when access points are connected, or by wireless links such as radio links or optic links. In case of a wireless link, interference with the traffic of said wireless communication system has to be avoided by choosing a different center frequency or transmission signal format. Note that, although the interconnection of access points may be preferred, it is also possible for stations to interconnect. For instance, two lap-top users, equipped with a single omnidirectional antenna each, may decide to interconnect themselves via a cable in order to exploit the diversity benefits of a distributed antenna.

According to an embodiment of a device according to the present invention, the device further comprises means for controlling the transmission power that is emitted by said device and/or by said stations, and said power control is performed in order to reduce the overall interference power while providing the Signal-to-Noise-and-Interference Ratio that is required for correct signal reception at both said device an said stations.

Power control may be performed by said device to reduce the power that is radiated with each beam. For instance, if a station is known to experience only a minor noise and interference power, the transmission power can be reduced accordingly when directing a transmission peak towards said station or when transmitting with an omnidirectional antenna characteristic. The SNIR required by said station may be considered in said power control process. Similar, when several data packets of different stations have to be spatially multiplexed on the transmission medium, the algorithm that determines the weight vectors for the respective stations may consider both the required SNIR at each station, the noise and interference power level at each station, and possibly the QoS requirements of said station. Power control levels may also be signaled to said stations in order to reduce the transmission power that is emitted by said stations when transmitting CTS messages or acknowledgment signals, because the spatially selective reception by said station, in particular forming reception beams towards said stations, allows for such a reduction of said stations' transmission powers.

According to an embodiment of a device according to the present invention, the device further comprises means for observing the transmissions of other devices within and/or without said communication system, means for analyzing the observed transmissions in order to detect transmission patterns therein, and means for at least partially adapting the transmissions initiated by said device to said detected transmission patterns in order to reduce interference between said device and said other devices.

According to the present invention, coexistence of different packet-oriented systems operating on the same transmission medium, which is characterized at least by the same time, carrier or sub-carrier frequency, spreading code and polarization, may be supported. For instance, if said device is an access point of a wireless communication system, said access point may observe the transmissions of other access points in the same or a different, but neighboring wireless communication system. This observation may be enhanced by the use of a spatially selective antenna. Transmissions of other access points may be identified by station identifiers contained in received in RTS/CTS messages that do not match the stations said device is exchanging data with. The observed transmission may be statistically analyzed, interpolated and extrapolated to assess patterns or periodicities therein. Such patterns may for instance appear when a station is downloading huge amounts of data from another access point and acknowledges each received data packet, whereas the other stations that are served by said access point do not perform significant download. Such traffic patterns may be considered by said device when temporally and/or spatially scheduling the future data packet transmissions. For instance, if another access point is known to periodically transmit a data packet to a first station that is closely located to a second station said device needs to transmit a data packet too, said device may schedule the transmission of said data packet to said second station at an instance when it knows that said other device will most likely not send a packet to said first station. Thus interference at both said first and second station is significantly reduced.

In this context, it may be advantageous that radio resource management is performed across the access points of a wireless communication system so that resources in the frequency, time, code or spatial domain can be efficiently shared among the access points with the aim to reduce interference inside and outside the wireless communication system. The radio resource management may be performed by one of said access points acting as a master.

According to an embodiment of a devices according to the present invention, said device represents an access point, a station or a relay in a wireless communication system.

A station or access point may act as a relay in order to increase the coverage area of an access point or station. Data packets and messages are then routed through said relay, so that a station which is in the coverage of said relay, but not in the coverage of an access point, may receive a data packet from said access point via said relay.

According to an embodiment of a device according to the present invention, said wireless communication system is operated according to the IEEE 802.11 standard or a derivative thereof, in particular the IEEE 802.11 g standard.

According to an embodiment of a device according to the present invention, said wireless communication system is a point-to-point or point-to-multipoint directional radio link system that replaces the transmission lines of an xDSL system.

It is further proposed that a wireless communication system with CSMA-based MAC comprises at least one device adapted to transmit at least a first and a second RTS message and at least a first and a second data packet on a transmission medium, and at least a first station and a second station, wherein said device is adapted to transmit said second RTS message after said first RTS message and before said transmission of said first data packet is finished, wherein said device is adapted to transmit said at least first and second data packet on said transmission medium at least partially in parallel, and wherein said device is adapted to use said spatially selective antenna to direct a transmission null towards said first station for the transmission of said second RTS message, to direct a transmission peak towards said first station for the transmission of said first data packet, and to direct a transmission peak towards said second station for the transmission of said second data packet.

It is further proposed that a method to be used in a wireless communication system with CSMA-based MAC comprises the steps of transmitting at least a first and a second RTS message and at least a first and a second data packet on a transmission medium, wherein said second RTS message is transmitted after said first RTS message and before said transmission of said first data packet is finished, wherein said at least first and second data packet are transmitted on said transmission medium at least partially in parallel, and wherein a spatially selective antenna is used to direct a transmission null towards a first station for the transmission of said second RTS message, to direct a transmission peak towards said first station for the transmission of said first data packet, and to direct a transmission peak towards a second station for the transmission of said second data packet.

It is further proposed that a wireless communication system with CSMA-based MAC comprises at least one device adapted to transmit one RTS message and at least a first and a second data packet on a transmission medium, and at least a first and a second station, wherein said one RTS message contains information on at least said first and said second station to which said at least first and second data packet are to be transmitted, respectively, wherein said device is adapted to use said spatially selective antenna to direct a transmission peak towards said first station and a transmission null towards said second station for the transmission of said first data packet and a transmission peak towards said second station and a transmission null towards said first station for the transmission of said second data packet, and wherein said transmission of said first data packet takes place at least partially in parallel to the transmission of said second data packet.

It is further proposed that a method to be used in a wireless communication system with CSMA-based MAC, comprises the steps of transmitting one RTS message and at least a first and a second data packet on a transmission medium, wherein said one RTS message contains information on at least a first and a second station to which said at least first and second data packet are to be transmitted, respectively, wherein a spatially selective antenna is used to direct a transmission peak towards said first station and a transmission null towards said second station for the transmission of said first data packet and a transmission peak towards said second station and a transmission null towards said first station for the transmission of said second data packet, and wherein transmission of said first data packet takes place at least partially in parallel to the transmission of said second data packet.

It is further proposed that a wireless communication system with CSMA-based MAC, comprises at least one device adapted to transmit a first RTS message, a data packet and a NULL message, which indicates that said transmission medium is idle, on a transmission medium, and at least a first station, wherein said device is adapted to transmit said NULL message after the transmission of said first RTS message and before the transmission of said data packet is finished, and wherein said device is adapted to use said spatially selective antenna to direct a transmission null towards said first station for said transmission of said NULL message and to direct a transmission peak towards said first station for said transmission of said data packet.

It is further proposed that a method to be used in a wireless communication system with CSMA-based MAC, comprises the steps of transmitting a first RTS message and a data packet on a transmission medium, transmitting a NULL message, which indicates that said transmission medium is idle, and wherein said NULL message is transmitted after the transmission of said first RTS message and before the transmission of said data packet is finished, and wherein a spatially selective antenna is used to direct a transmission null towards a first station for said transmission of said NULL message and to direct a transmission peak towards said first station for said transmission of said data packet.

It is further proposed that a wireless communication system with CSMA-based MAC, comprises at least one device adapted to transmit a first RTS message and/or data packet on a transmission medium, and to set a timer that indicates when said transmission medium will no longer be busy, and at least a first station, wherein said timer is set to its minimum value, wherein said device is adapted to use a spatially selective antenna to direct a transmission peak towards said first station for said transmission of said data packet, and wherein said first data packet contains information on the duration of further data packet transmissions for said first station.

It is further proposed that a method to be used in a wireless communication system with CSMA-based MAC, comprising the steps of transmitting a first RTS message and/or data packet on a transmission medium, and setting a timer that indicates when said transmission medium will no longer be busy, wherein said timer is set to its minimum value, wherein a spatially selective antenna is used to direct a transmission peak towards a first station for said transmission of said data packet, and wherein said first data packet contains information on the duration of further data packet transmissions for said first station.

It is further proposed that a wireless communication system with CSMA-based MAC comprises at least one device adapted to transmit at least a first RTS message and/or at least one data packet on a transmission medium and to set a timer that indicates when said transmission medium will no longer be busy, and at least a first station, wherein said device is adapted to use said spatially selective antenna to direct a transmission peak or a transmission null towards at least a first station for the transmission of said at least first RTS message and for the transmission of said at least one data packet, and wherein said device is adapted to transmit said at least first RTS message and/or said at least one data packet on said transmission medium only after said timer has expired.

It is further proposed that a method to be used in a wireless communication system with CSMA-based MAC, comprises the steps of transmitting at least a first RTS message and/or at least one data packet on a transmission medium, setting a timer that indicates when said transmission medium will no longer be busy, and wherein a spatially selective antenna is used to direct a transmission peak or a transmission null towards at least a first station for the transmission of said at least first RTS message and for the transmission of said at least one data packet, and wherein said at least first RTS message and/or said at least one data packet is transmitted on said transmission medium only after said timer has expired.

It is further proposed a wireless communication system with CSMA-based MAC comprises at least one device adapted to transmit at least a first RTS message and/or at least one data packet on a transmission medium and to set a timer that indicates when said transmission medium will no longer be busy, and at least a first station, wherein said device is adapted to use a spatially selective antenna to direct a transmission peak or a transmission null towards at least a first station for the transmission of said at least first RTS message and for the transmission of said at least one data packet, and wherein said device is adapted to transmit said at least first RTS message and/or said at least one data packet on said transmission medium although said timer indicates that said transmission medium is still busy.

It is further proposed a method to be used in a wireless communication system with CSMA-based MAC, comprising the steps of transmitting at least a first RTS message and/or at least one data packet on a transmission medium, setting a timer that indicates when said transmission medium will no longer be busy, and wherein a spatially selective antenna is used to direct a transmission peak or a transmission null towards at least a first station for the transmission of said at least first RTS message and for the transmission of said at least one data packet, and wherein said at least first RTS message and/or said at least one data packet are transmitted on said transmission medium although said timer indicates that said transmission medium is still busy.

It is further proposed a computer program with instructions operable to cause a processor to perform the above-described method steps.

It is further proposed that a device to be used in a wireless communication system comprises a spatially selective antenna for directing a transmission peak or a transmission null towards at least one desired communication device for a transmission of at least one data signal, wherein said spatially selective antenna is a distributed antenna consisting of the antenna elements of at least two communication devices of said wireless communication system, and wherein said communication devices are connected via a wired or wireless link.

Said device may for instance be an access point or a station of said wireless communication system. Said wireless communication system may for instance be a WLAN system wherein several access points are connected, or a mobile radio communications system wherein several base stations or base transceiver stations are connected. Said device may only be equipped with a standard omnidirectional antenna. However, it may be interconnected with communication devices such as stations or other access points, so that said omnidirectional antenna and the antennas of said stations or access points can be combined into an antenna array. Said stations or other access points may either be equipped with omnidirectional antennas or with all other kinds of antennas, such as sectored antennas, switched beam antennas or antenna arrays. However, said device has to provide means to operate said distributed antenna for signal transmission and reception.

Directing a transmission peak towards a desired communication device is to be understood as a technique of distributing as much transmission power as possible on one or more propagation paths of a spatial channel between said device with said spatially selective antenna and said desired communication device. Thus the antenna characteristic does not necessarily have to take its maximum in the direction of said desired communication device, as seen from said spatially selective antenna at said device, in particular if the Line-of-Sight (LOS) between said device and said desired communication device is blocked or otherwise heavily attenuated. Distributing power on the respective propagation paths is generally considered as forming "beams" towards the angles under which said propagation paths arrive or depart from said spatially selective antenna (in azimuth and/or elevation). In the sequel, the term "beam" will also be used in a more general sense to describe the antenna characteristic of said spatially selective antenna used to transmit a data packet to desired communication device, wherein said antenna characteristic may of course comprise a plurality of beams, each for power distribution on a single propagation path in the spatial channel between said device and a station.

In directing a transmission peak towards a desired communication device, the spatial channels between said device and further desired communication devices, to which signals shall be transmitted by said spatially selective antenna at least partially in parallel to the transmission of said first data packet bound for' said desired communication device, might as well be taken into account. In particular if several data packets have to be transmitted at least partially in parallel, i.e. if spatial multiplexing takes place, it is not always possible to distribute transmission power on all the propagation paths between said device and said desired communication device, because propagation paths between further desired communication devices and said device may overlap with the propagation paths of said first device. Overlapping paths then should not be used at all, or a different set of stations the data packets of which are to be spatially multiplexed should be chosen by applying spatial scheduling techniques, which may be based on the information contained in a routing table.

Directing a transmission peak towards said desired communication device with a spatially selective antenna when transmitting said first data packet ensures that most of the transmission energy is concentrated towards said desired communication device, so that, for a constant overall transmission power, the Signal-to-Noise-and-Interference Ratio (SNIR) of the signals received at said desired communication device is considerably increased as compared to the transmission with an omnidirectional antenna. Furthermore, less interference is caused at devices or communication devices which are not positioned in the elongation of the beams that may be formed by the spatially selective antenna to illuminate the propagation paths in the spatial channel between said device and said desired communication device. The increased SNIR may be exploited in a way that less error protection may be admitted to the transmitted signals, thus increasing the data rate of the signals transmitted in said data packet, or higher modulation alphabets may be used, which, for constant symbol rate, as well increases the data rate. For instance, instead of Binary Phase Shift Keying (BPSK), Quaternary Phase Shift Keying (QPSK) could be applied as modulation technique.

An adaptive antenna array represents a group of antenna elements, wherein each antenna element is fed with an element-specific transmission signal that is obtained from the multiplication of a complex-valued weight factor with the signal that is to be transmitted by the adaptive antenna array. This multiplication may be performed in base-band, in an intermediate frequency range or at the radio frequency. The weight factors for the antenna elements are usually combined in a complex-valued weight vector, that represents the antenna characteristic or beam that is created by the antenna when a transmission signal is projected onto the single antenna elements via multiplication with said weight vector. Exploiting the superposition principle, several transmission signals, for instance bound for different stations, may be projected onto the antenna elements with respective weight vectors and then concurrently transmitted by the adaptive antenna array. The term adaptive refers to the ability to electronically steer the beam of the antenna array by simply changing the weight vector, for instance based on a change in the DOA of a station to which a signal is transmitted. In the reception case, the signals received at the single antenna elements are multiplied with the weight factors within said weight vectors and then summed to obtain the spatially filtered receive signal.

The beam-width of an antenna array is mainly influenced by the number of antenna elements and by the spacing between the antenna elements. The beam-width decreases with increasing numbers of elements and with increasing distance between the antenna elements. If the distance between the antenna elements increases, the signals received at the single antenna elements become more and more uncorrelated, i.e. they do no longer only differ in phase but also show different amplitude due to the experience of different fading processes. With uncorrelated signals, diversity techniques are applicable, as for instance micro- or macro-diversity. In the transmission case, the antenna characteristic will then no longer appear like a beam. However, it is still possible to direct a transmission peak towards a station, i.e. to distribute as much transmission power as possible on the propagation paths between said device and a station. For instance, a spatial channel between an antenna array and a station, which is time-invariant and shows frequency-flat fading, is characterized by a vector that contains a complex-valued transmission factor for the channel between each antenna element of the antenna array and the single antenna of said station. To direct a transmission peak towards said station, a weight vector that simply contains the conjugate-complex transmission factors as weight factors can be used. Alternatively, techniques such as Space-Time Codes can be deployed to exploit the diversity of the wireless channel.

The use of antenna elements that are distributed over the deployment area of the wireless communication system allows to exploit macro diversity techniques, that exploit that signals transmitted by a station arrive at the distributed antenna elements rather uncorrelated, because they propagated on different propagation paths and thus experienced different fading. The interconnection of the devices the antennas of which are combined into a distributed antenna may be achieved by a wired link, which is particularly advantageous when access points are connected, or by wireless links such as radio links or optic links. In case of a wireless link, interference with the traffic of said wireless communication system has to be avoided by choosing a different transmission signal center frequency, polarization, transmission time, spreading code or transmission signal format. Note that, although the interconnection of access points may be preferred, it is also possible for stations to interconnect. For instance, two lap-top users, equipped with a single omnidirectional antenna each, may decide to interconnect themselves via a cable in order to exploit the diversity benefits of a distributed antenna.

According to this approach, it is advantageous that said distributed antenna allows for both the increase of the SNIR at said desired communication devices or the use of spatial multiplexing techniques, so that the use of the available transmission bandwidth is enhanced, collisions are spatially avoided and coexistence with other wireless communications systems is enhanced.

In this context, it may be advantageous that radio resource management is performed across the access points of a wireless communication system so that resources in the frequency, time, code or spatial domain can be efficiently shared among the access points with the aim to reduce interference inside and outside the wireless communication system. The radio resource management may be performed by one of said access points acting as a master.-To this aim, the physical connection, which is intended to connect the antenna elements of the single access points or stations, may be extended by protocol devices to carry the information that is necessary to perform the radio resource management across the access points.

According to an embodiment of a device according to the present invention, said at least two communication devices and said at least one desired communication device represent access points, stations or relays in said wireless communication system.

A station or access point may act as a relay in order to increase the coverage area of an access point or station. Data packets and messages are then routed through said relay, so that a station which is in the coverage of said relay, but not in the coverage of an access point, may receive a data packet from said access point via said relay.

According to an embodiment of a device according to the present invention, said spatially selective antenna can be further deployed for directing a reception peak or a reception null towards at least one desired communication device for a reception of at least one data signal.

If two data signals are transmitted by a respective first and second communication device at least partially in parallel on said jointly used transmission medium, said device deploys its spatially selective antenna to direct a reception peak towards a first (desired) communication device and a reception null towards a second communication device for the reception of the data signal that has been transmitted by said first communication device, and vice versa for the reception of the data signal that has been transmitted by said second communication device. Whereas the forming of transmission peaks and nulls is an active process, where, for instance in the case of an adaptive antenna array with controllable weights for each antenna element, weights are adjusted to achieve an antenna characteristic with the desired peaks and nulls and multiplied with the transmission signal prior to transmission, forming reception peaks and nulls is a passive process wherein the receive signals at each antenna element are multiplied with an adjusted weight in order to perform spatial filtering of the received signals. In both cases, the transmission parameters of each communication device, for instance the DOA or spatial channel of the station as seen from an adaptive antenna array at said device, have to been known in order to compute the weights that represent the transmission/reception antenna characteristic. In the reception case, the signals received at all antenna elements may be processed to estimate said transmission parameters, and after said estimation, the weights may be computed under joint or separated consideration of the estimated transmission parameters of all stations that contributed to that receive signals by transmitting signals. The received signals at the antenna elements may then be multiplied with the weights that have been computed for each desired communication device, so that the signals as transmitted by the respective desired communication devices can be reproduced.

According to an embodiment of a device according to the present invention, the device further comprises means for estimating transmission parameters that are required to direct transmission and/or reception peaks towards said at least one desired communication device, and said transmission parameters are at least partially estimated from receive signals at each of said antenna elements that originate at least partially from said at least one data signal transmitted by said at least one desired communication device.

Estimation of transmission parameters is based on the signals that are received at the antenna of said device, wherein said signals are the signals that are transmitted by said communication devices and propagate through the radio channel, wherein propagation effects such as fading and shadowing attenuate and distort the originally transmitted signals. Whereas an attenuation factor is comparatively easily detected by comparison of the transmission power level of a carrier or sub-carrier (if known) and the corresponding receive power level, spatial information is more difficult to obtain from a received signal. A coarse estimation of the DOA may for instance be achieved by switching through the sectors of a sectored antenna with controllable sectors or a switched beam antenna. For adaptive antenna arrays, a couple of high resolution parameter estimation techniques have been developed, for instance the subspace-based MUSIC and ESPRIT algorithms or the maximum-likelihood-based SAGE algorithm. Transmission parameter estimation can in general be performed blind or non-blind. Blind techniques do not require a training sequence, i.e. it is not required that a part of the transmitted signal is known at the receiver before its actual reception. In contrast, non-blind algorithms require such knowledge. In an OFDM system, it is common practice to transmit so-called pilot tones on the sub-carriers of the OFDM system that are known at the receiver and, under certain circumstances, allow to estimate the spatial channel between each communication device and each antenna element of an adaptive antenna array deployed at said device and that for each sub-carrier. It mainly depends on the technique according to which the antenna characteristic is adjusted whether the complete spatial channels are required or whether a DOA, possibly with a corresponding power level, is sufficient.

According to an embodiment of a device according to the present invention, said transmission parameters comprise information on the spatial propagation channel between said device and said at least one desired communication device, and/or on the noise and interference conditions at said at least one desired communication device, and/or on the best PHY mode that can be used with said at least one desired communication device.

Said transmission parameters may represent parameters such as the Direction-of-Arrival (DOA) of the main or a couple of propagation paths of a spatial channel between a communication device and said device, the corresponding attenuations, Doppler shifts, path delays, or the spatial signature of a communication device. Furthermore, relative or absolute noise and interference levels encountered at a communication device may be available. Advantageously this information is combined into a decision which Physical Mode (PHY mode) is best used when transmitting a data packet to a communication device, wherein said PHY mode summarizes parameters such as the symbol alphabet used in modulation, as for instance Binary Phase Shift Keying (BPSK) or Quaternary Phase Shift Keying (QPSK), or the code rate applied in channel coding, as for instance convolutional or turbo coding.

According to an embodiment of a device according to the present invention, said device is adapted to use said transmission parameters to schedule the desired communication devices to which data signals are transmitted to and/or received from in parallel.

Based on said transmission parameters, said device may decide which communication devices are suited for spatial multiplexing. For instance, the DOAs of communication devices may be considered, and it may be demanded that there has to be a minimum angular separation between the DOAs of said respective communication devices if data packets shall be concurrently transmitted to said communication device on said jointly used transmission medium. More concise decision algorithms may be imagined, for example checking the orthogonality of spatial signatures of communication devices. The PHY mode and QoS requirements of said communication devices may also be considered in the scheduling process.

According to an embodiment of a device according to the present invention, the device further comprises means for transmitting and/or receiving signals to and/or from desired communication devices that use spatially selective antennas.

If said communication devices are equipped with spatially selective antennas as well, the transmission and reception means of said device may have to be changed to achieve optimum throughput on the resulting Multiple-Input-Multiple-Output (MIMO) links between said device and said communication devices. Said means in said device may for instance be adapted to allow for the application of the Bell Laboratories Layered Space-Time Architecture (BLAST) or similar spatial multiplexing techniques that allow for the concurrent transmission of several data packets between said device and one single communication device.

According to an embodiment of a device according to the present invention, the device further comprises means for controlling the transmission power that is emitted by said device and/or by said at least one desired communication devices in order to reduce the overall interference power while providing the Signal-to-Noise-and-Interference Ratio that is required for correct signal reception at both said device an said at least one communication device.

Power control may be performed by said device to reduce the power that is radiated with each beam. For instance, if a communication device is known to experience only a minor noise and interference power, the transmission power can be reduced accordingly when directing a transmission peak towards said communication device or when transmitting with an omnidirectional antenna characteristic. The SNIR required by said communication device may be considered in said power control process. Similar, when several data packets of different communication devices have to be spatially multiplexed on the transmission medium, the algorithm that determines the weight vectors for the respective communication devices may consider both the required SNIR at each communication device, the noise and interference power level at each communication device, and possibly the QoS requirements of said communication device. Power control levels may also be signaled to said communication devices in order to reduce the transmission power that is emitted by said communication devices when transmitting CFS messages or acknowledgment signals, because the spatially selective reception by said communication device, in particular forming reception beams towards said communication devices, allows for such a reduction of said communication devices' transmission powers.

According to an embodiment of a device according to the present invention, the device further comprises means for observing the transmissions of other communication devices within and/or without said communication system, means for analyzing the observed transmissions in order to detect transmission patterns therein, and means for at least partially adapting the transmissions initiated by said device to said detected transmission patterns in order to reduce interference between said device and said other communication devices.

According to the present invention, coexistence of different packet-oriented systems operating on the same transmission medium, which is characterized at least by the same time, carrier or sub-carrier frequency, spreading code and polarization, may be supported. For instance, if said device is an access point of a wireless communication system, said access point may observe the transmissions of other access points in the same or a different, but neighboring wireless communication system. This observation may be enhanced by the use of a spatially selective antenna. Transmissions of other access points may be identified by communication device identifiers contained in received in received data packets that do not match the communication devices said device is exchanging data with. The observed transmission may be statistically analyzed, interpolated and extrapolated to assess patterns or periodicities therein. Such patterns may for instance appear when a communication device is downloading huge amounts of data from another access point and acknowledges each received data packet, whereas the other communication devices that are served by said access point do not perform significant download. Such traffic patterns may be considered by said device when temporally and/or spatially scheduling the future data packet transmissions. For instance, if another access point is known to periodically transmit a data packet to a first communication device that is closely located to a second communication device said device needs to transmit a data packet too, said device may schedule the transmission of said data packet to said second communication device at an instance when it knows that said other device will most likely not send a packet to said first communication device. Thus interference at both said first and second communication device is significantly reduced.

According to an embodiment of a device according to the present invention, said wireless communication system uses a CSMA-based MAC.

Said device may for instance be an access point of a wireless communication system serving a plurality of stations, wherein access of said device and said stations to the jointly used transmission medium is controlled by a Carrier Sense Multiple Access (CSMA) technique, wherein additionally Collision Avoidance (CA) may be performed. In a packet-oriented CSMA system, said device and said stations are only allowed to transmit messages and data packets if the shared transmission medium is sensed to be idle, wherein said transmission medium is understood to be defined by the time, carrier frequency (or sub-carrier frequency in an Orthogonal Frequency Division Multiplex (OFDM) system), spreading code and polarization state of the transmission.

According to an embodiment of a device according to the present invention, said wireless communication system is operated according to the IEEE 802.11 standard or a derivative thereof, in particular the IEEE 802.11 g standard.

According to an embodiment of a device according to the present invention, said wireless communication system is a point-to-point or point-to-multipoint directional radio link system that replaces the transmission lines of an xDSL system.

It is further proposed that a wireless communication system comprises at least two communication devices, and at least one desired communication device, wherein a spatially selective antenna is used for directing a transmission peak or a transmission null towards at least one desired communication device for a transmission of at least one data signal, and wherein said spatially selective antenna is a distributed antenna consisting of the antenna elements of at least two communication devices of said wireless communication system, and wherein said communication devices are connected via a wired or wireless link.

It is further proposed that a method to be used in a wireless communication system, comprises the steps of directing a transmission peak or a transmission null with a spatially selective antenna towards at least one desired communication device for a transmission of at least one data signal, wherein said spatially selective antenna is a distributed antenna consisting of the antenna elements of at least two communication devices of said wireless communication system, and wherein said communication devices are connected via a wired or wireless link.

It is further proposed a computer program with instructions operable to cause a processor to perform the above mentioned method steps.

It is further proposed that a device to be used in a wireless communication system comprises means for observing the transmissions of other communication devices, means for analyzing the observed transmissions in order to detect transmission patterns therein, and means for at least partially adapting the transmissions initiated by said device to said detected transmission patterns in order to reduce interference between said device and said other communication devices.

According to the present invention, coexistence of different communication systems operating on the same transmission medium, which is characterized at least by the same time, carrier or sub-carrier frequency, spreading code and polarization, may be supported. Said systems may be packet-oriented or not. For instance, such communications systems may be a WLAN system or a mobile radio system or a radio broadcast system. For instance, if said device is an access point of a wireless communication system serving a plurality of stations, and if said communication devices are other access points or stations served by said other access points, said access point may observe the transmissions of said other access points. This observation may be enhanced by the use of a spatially selective antenna. Transmissions of other access points may be identified by station identifiers contained in received data packets that do not match the stations said device is exchanging data with. The observed transmissions may be statistically analyzed, interpolated and extrapolated to assess patterns or periodicities therein. Such patterns may for instance appear when a station is downloading huge amounts of data from another access point and acknowledges each received data packet, whereas the other stations that are served by said access point do not perform significant download. Such traffic patterns may be considered by said device when temporally and/or spatially scheduling the future data packet transmissions. For instance, if another access point is known to periodically transmit a data packet to a first station that is closely located to a second station said device needs to transmit a data packet to, said device may schedule the transmission of said data packet to said second station at an instance when it knows that said other device will most likely not send a packet to said first station. Thus interference at both said first and second station is significantly reduced.

According to an embodiment of a device according to the present invention, said other communication devices are communication devices within and/or without said communication system.

Said communication devices the transmissions of which are observed by said device may be within the same wireless communication system as said device, for instance other access points or stations served by other access points, or may be communication devices of a different wireless communication system, wherein the transmissions of said different wireless communication system at least partially interfere with the transmissions of said wireless communication system of said device.

According to an embodiment of a device according to the present invention, said device and said other communication devices are access points, stations or relays.

A station or access point may act as a relay in order to increase the coverage area of an access point or station. Data packets and messages are then routed through said relay, so that a station which is in the coverage of said relay, but not in the coverage of an access point, may receive a data packet from said access point via said relay.

According to an embodiment of a device according to the present invention, the device further comprises a spatially selective antenna for directing a transmission peak or a transmission null towards at least one desired communication device for a transmission of at least one data signal.

Directing a transmission peak towards a desired communication device is to be understood as a technique of distributing as much transmission power as possible on one or more propagation paths of a spatial channel between said device with said spatially selective antenna and said desired communication device. Thus the antenna characteristic does not necessarily have to take its maximum in the direction of said desired communication device, as seen from said spatially selective antenna at said device, in particular if the Line-of-Sight (LOS) between said device and said desired communication device is blocked or otherwise heavily attenuated. Distributing power on the respective propagation paths is generally considered as forming "beams" towards the angles under which said propagation paths arrive or depart from said spatially selective antenna (in azimuth and/or elevation). In the sequel, the term "beam" will also be used in a more general sense to describe the antenna characteristic of said spatially selective antenna used to transmit a data packet to desired communication device, wherein said antenna characteristic may of course comprise a plurality of beams, each for power distribution on a single propagation path in the spatial channel between said device and a station.

In directing a transmission peak towards a desired communication device, the spatial channels between said device and further desired communication devices, to which signals shall be transmitted by said spatially selective antenna at least partially in parallel to the transmission of said first data packet bound for said desired communication device, might as well be taken into account. In particular if several data packets have to be transmitted at least partially in parallel, i.e. if spatial multiplexing takes place, it is not always possible to distribute transmission power on all the propagation paths between said device and said desired communication device, because propagation paths between further desired communication devices and said device may overlap with the propagation paths of said first device. Overlapping paths then should not be used at all, or a different set of stations the data packets of which are to be spatially multiplexed should be chosen by applying spatial scheduling techniques, which may be based on the information contained in a routing table.

Directing a transmission peak towards said desired communication device with a spatially selective antenna when transmitting said first data packet ensures that most of the transmission energy is concentrated towards said desired communication device, so that, for a constant overall transmission power, the Signal-to-Noise-and-Interference Ratio (SNIR) of the signals received at said desired communication device is considerably increased as compared to the transmission with an omnidirectional antenna. Furthermore, less interference is caused at devices or communication devices which are not positioned in the elongation of the beams that may be formed by the spatially selective antenna to illuminate the propagation paths in the spatial channel between said device and said desired communication device. The increased SNIR may be exploited in a way that less error protection may be admitted to the transmitted signals, thus increasing the data rate of the signals transmitted in said data packet, or higher modulation alphabets may be used, which, for constant symbol rate, as well increases the data rate. For instance, instead of Binary Phase Shift Keying (BPSK), Quaternary Phase Shift Keying (QPSK) could be applied as modulation technique.

According to the device of the present invention, it may be preferred that the device further comprises a spatially selective antenna for directing a reception peak or a reception null towards at least one desired communication device for a reception of at least one data signal.

If two data signals are transmitted by a respective first and second communication device at least partially in parallel on said jointly used transmission medium, said device deploys its spatially selective antenna to direct a reception peak towards a first (desired) communication device and a reception null towards a second communication device for the reception of the data signal that has been transmitted by said first communication device, and vice versa for the reception of the data signal that has been transmitted by said second communication device. Whereas the forming of transmission peaks and nulls is an active process, where, for instance in the case of an adaptive antenna array with controllable weights for each antenna element, weights are adjusted to achieve an antenna characteristic with the desired peaks and nulls and multiplied with the transmission signal prior to transmission, forming reception peaks and nulls is a passive process wherein the receive signals at each antenna element are multiplied with an adjusted weight in order to perform spatial filtering of the received signals. In both cases, the transmission parameters of each communication device, for instance the DOA or spatial channel of the station as seen from an adaptive antenna array at said device, have to been known in order to compute the weights that represent the transmission/reception antenna characteristic. In the reception case, the signals received at all antenna elements may be processed to estimate said transmission parameters, and after said estimation, the weights may be computed under joint or separated consideration of the estimated transmission parameters of all stations that contributed to that receive signals by transmitting signals. The received signals at the antenna elements may then be multiplied with the weights that have been computed for each desired communication device, so that the signals as transmitted by the respective desired communication devices can be reproduced.

According to an embodiment of a device according to the present invention, the device further comprises means for estimating transmission parameters that are required to direct transmission and/or reception peaks towards said at least one desired communication device, wherein said transmission parameters are at least partially estimated from receive signals at each of said antenna elements that originate at least partially from said at least one data signal transmitted by said at least one desired communication device.

Estimation of transmission parameters is based on the signals that are received at the antenna of said device, wherein said signals are the signals that are transmitted by said communication devices and propagate through the radio channel, wherein propagation effects such as fading and shadowing attenuate and distort the originally transmitted signals. Whereas an attenuation factor is comparatively easily detected by comparison of the transmission power level of a carrier or sub-carrier (if known) and the corresponding receive power level, spatial information is more difficult to obtain from a received signal. A coarse estimation of the DOA may for instance be achieved by switching through the sectors of a sectored antenna with controllable sectors or a switched beam antenna. For adaptive antenna arrays, a couple of high resolution parameter estimation techniques have been developed, for instance the subspace-based MUSIC and ESPRIT algorithms or the maximum-likelihood-based SAGE algorithm. Transmission parameter estimation can in general be performed blind or non-blind. Blind techniques do not require a training sequence, i.e. it is not required that a part of the transmitted signal is known at the receiver before its actual reception. In contrast, non-blind algorithms require such knowledge. In an OFDM system, it is common practice to transmit so-called pilot tones on the sub-carriers of the OFDM system that are known at the receiver and, under certain circumstances, allow to estimate the spatial channel between each communication device and each antenna element of an adaptive antenna array deployed at said device and that for each sub-carrier. It mainly depends on the technique according to which the antenna characteristic is adjusted whether the complete spatial channels are required or whether a DOA, possibly with a corresponding power level, is sufficient.

According to an embodiment of a device according to the present invention, said transmission parameters comprise information on the spatial propagation channel between said device and said at least one desired communication device, and/or on the noise and interference conditions at said at least one desired communication device, and/or on the best PHY mode that can be used with said at least one desired communication device.

Said transmission parameters may represent parameters such as the Direction-of-Arrival (DOA) of the main or a couple of propagation paths of a spatial channel between a communication device and said device, the corresponding attenuations, Doppler shifts, path delays, or the spatial signature of a communication device. Furthermore, relative or absolute noise and interference levels encountered at a communication device may be available. Advantageously this information is combined into a decision which Physical Mode (PHY mode) is best used when transmitting a data packet to a communication device, wherein said PHY mode summarizes parameters such as the symbol alphabet used in modulation, as for instance Binary Phase Shift Keying (BPSK) or Quaternary Phase Shift Keying (QPSK), or the code rate applied in channel coding, as for instance convolutional or turbo coding.

According to an embodiment of a device according to the present invention, said device is adapted to use said transmission parameters to schedule the desired communication devices to which data signals are transmitted to and/or received from in parallel.

Based on said transmission parameters, said device may decide which communication devices are suited for spatial multiplexing. For instance, the DOAs of communication devices may be considered, and it may be demanded that there has to be a minimum angular separation between the DOAs of said respective communication devices if data packets shall be concurrently transmitted to said communication device on said jointly used transmission medium. More concise decision algorithms may be imagined, for example checking the orthogonality of spatial signatures of communication devices. The PHY mode and QoS requirements of said communication devices may also be considered in the scheduling process.

According to an embodiment of a device according to the present invention, the device further comprises means for transmitting and/or receiving signals to and/or from desired communication devices that use spatially selective antennas.

If said communication devices are equipped with spatially selective antennas as well, the transmission and reception means of said device may have to be changed to achieve optimum throughput on the resulting Multiple-Input-Multiple-Output (MIMO) links between said device and said communication devices. Said means in said device may for instance be adapted to allow for the application of the Bell Laboratories Layered Space-Time Architecture (BLAST) or similar spatial multiplexing techniques that allow for the concurrent transmission of several data packets between said device and one single communication device.

According to an embodiment of a device according to the present invention, the device further comprises means for controlling the transmission power that is emitted by said device and/or by said at least one desired communication devices in order to reduce the overall interference power while providing the Signal-to-Noise-and-Interference Ratio that is required for correct signal reception at both said device an said at least one communication device.

Power control may be performed by said device to reduce the power that is radiated with each beam. For instance, if a communication device is known to experience only a minor noise and interference power, the transmission power can be reduced accordingly when directing a transmission peak towards said communication device or when transmitting with an omnidirectional antenna characteristic. The SNIR required by said communication device may be considered-in said power control process. Similar, when several-data packets of different communication devices have to be spatially multiplexed on the transmission medium, the algorithm that determines the weight vectors for the respective communication devices may consider both the required SNIR at each communication device, the noise and interference power level at each communication device, and possibly the QoS requirements of said communication device. Power control levels may also be signaled to said communication devices in order to reduce the transmission power that is emitted by said communication devices when transmitting CTS messages or acknowledgment signals, because the spatially selective reception by said communication device, in particular forming reception beams towards said communication devices, allows for such a reduction of said communication devices' transmission powers.

According to an embodiment of a device according to the present invention, said wireless communication system uses a CSMA-based MAC.

Said device may for instance be an access point of a wireless communication system serving a plurality of stations, wherein access of said device and said stations to the jointly used transmission medium is controlled by a Carrier Sense Multiple Access (CSMA) technique, wherein additionally Collision Avoidance (CA) may be performed. In a packet-oriented CSMA system, said device and said stations are only allowed to transmit messages and data packets if the shared transmission medium is sensed to be idle, wherein said transmission medium is understood to be defined by the time, carrier frequency (or sub-carrier frequency in an Orthogonal Frequency Division Multiplex (OFDM) system), spreading code and polarization state of the transmission.

According to an embodiment of a device according to the present invention, said wireless communication system is operated according to the IEEE 802.11 standard or a derivative thereof, in particular the IEEE 802.11 g standard.

According to an embodiment of a device according to the present invention, said wireless communication system is a point-to-point or point-to-multipoint directional radio link system that replaces the transmission lines of an xDSL system.

According to an embodiment of a device according to the present invention, said spatially selective antenna is a sectored antenna with dynamically activated sectors, or a switched beam antenna, or an adaptive antenna array with controllable weights.

With a sectored antenna with controllable sectors, it can be dynamically chosen which sector of said antenna transmits the transmission signal. Such an antenna may for instance comprise six sectors of an aperture angle of 60°, or similar. In a switched beam antenna, the maximum of the antenna characteristic can be dynamically switched towards different angles. The width of the beam for each angle position may substantially differ. A switched beam antenna may for instance be realized with an antenna array, i.e. a group of single antenna elements, wherein the antenna elements are controlled by a phase delay network that delays the signal that is to be transmitted from each respective antenna element by pre-defined, element-specific factors to achieve the desired antenna characteristic. This is possible for a limited number of antenna characteristics, each with its own main looking-direction.

An adaptive antenna array represents a group of antenna elements, wherein each antenna element is fed with an element-specific transmission signal that is obtained from the multiplication of a complex-valued weight factor with the signal that is to be transmitted by the adaptive antenna array. This multiplication may be performed in base-band, in an intermediate frequency range or at the radio frequency. The weight factors for the antenna elements are usually combined in a complex-valued weight vector, that represents the antenna characteristic or beam that is created by the antenna when a transmission signal is projected onto the single antenna elements via multiplication with said weight vector. Exploiting the superposition principle, several transmission signals, for instance bound for different stations, may be projected onto the antenna elements with respective weight vectors and then concurrently transmitted by the adaptive antenna array. The term adaptive refers to the ability to electronically steer the beam of the antenna array by simply changing the weight vector, for instance based on a change in the DOA of a station to which a signal is transmitted. In the reception case, the signals received at the single antenna elements are multiplied with the weight factors within said weight vectors and then summed to obtain the spatially filtered receive signal.

The beam-width of an antenna array is mainly influenced by the number of antenna elements and by the spacing between the antenna elements. The beam-width decreases with increasing numbers of elements and with increasing distance between the antenna elements. If the distance between the antenna elements increases, the signals received at the single antenna elements become more and more uncorrelated, i.e. they do no longer only differ in phase but also show different amplitude due to the experience of different fading processes. With uncorrelated signals, diversity techniques are applicable, as for instance micro- or macro-diversity. In the transmission case, the antenna characteristic will then no longer appear like a beam. However, it is still possible to direct a transmission peak towards a station, i.e. to distribute as much transmission power as possible on the propagation paths between said device and a station. For instance, a spatial channel between an antenna array and a station, which is time-invariant and shows frequency-flat fading, is characterized by a vector that contains a complex-valued transmission factor for the channel between each antenna element of the antenna array and the single antenna of said station. To direct a transmission peak towards said station, a weight vector that simply contains the conjugate-complex transmission factors as weight factors can be used. Alternatively, techniques such as Space-Time Codes can be deployed to exploit the diversity of the wireless channel.

It is further proposed that a wireless communication system comprises at least one device, wherein said device is adapted to observe the transmissions of other communication devices, to analyze the observed transmissions in order to detect transmission patterns therein, and to at least partially adapt the transmissions initiated by said device to said detected transmission patterns in order to reduce interference between said device and said other communication devices.

It is further proposed that a method to be used in device of a wireless communication system comprises the steps of observing the transmissions of other communication devices, analyzing the observed transmissions in order to detect transmission patterns therein, and at least partially adapting the transmissions initiated by said device to said detected transmission patterns in order to reduce interference between said device and said other communication devices.

It is further proposed a computer program with instructions operable to cause a processor to perform the above-mentioned method steps.

BRIEF DESCRIPTION OF THE FIGURES

These and other aspects of the invention will be apparent from and elucidated with reference to the embodiments described hereinafter. In the figures show.

DETAILED DESCRIPTION OF THE FIGURES

First Embodiment

Figure 1:
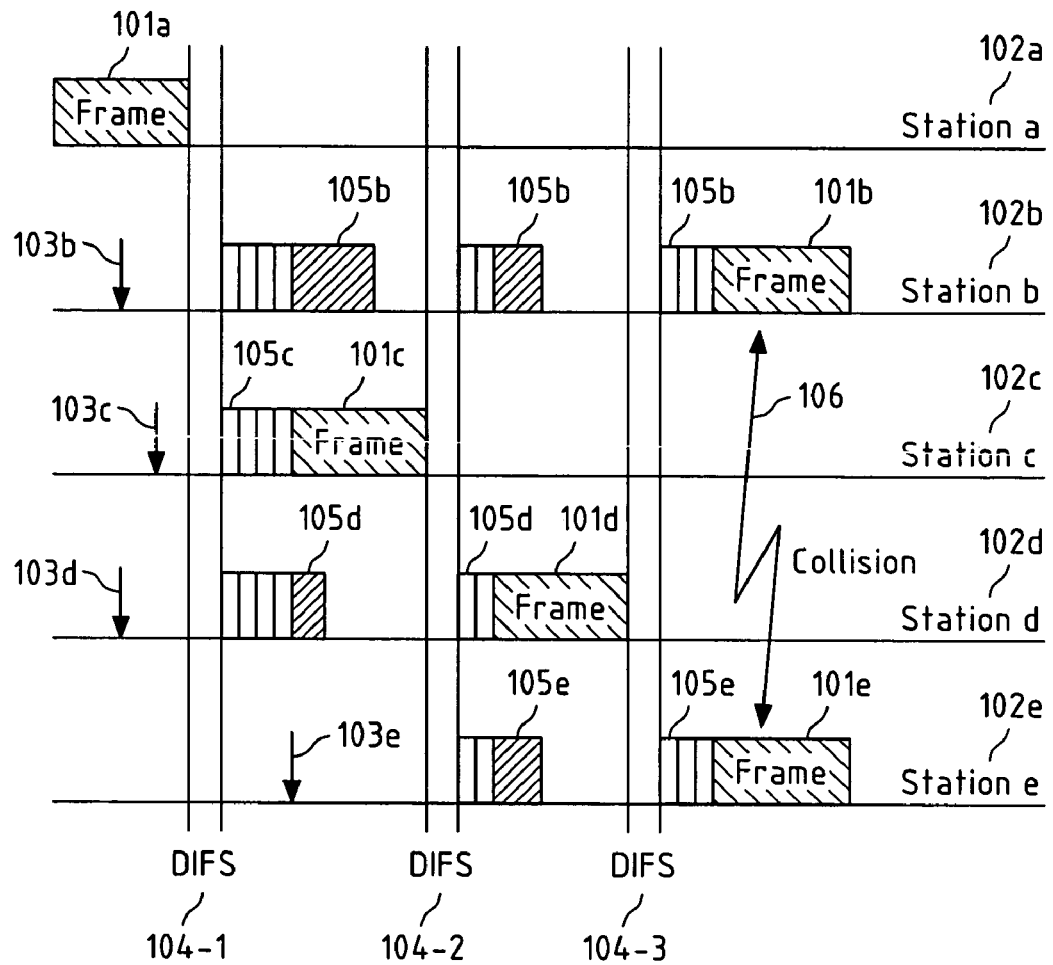
FIG. 1: An illustration of the Carrier Sense Multiple Access (CSMA) based medium access in a wireless communication system according to the prior art.
Figure 2:
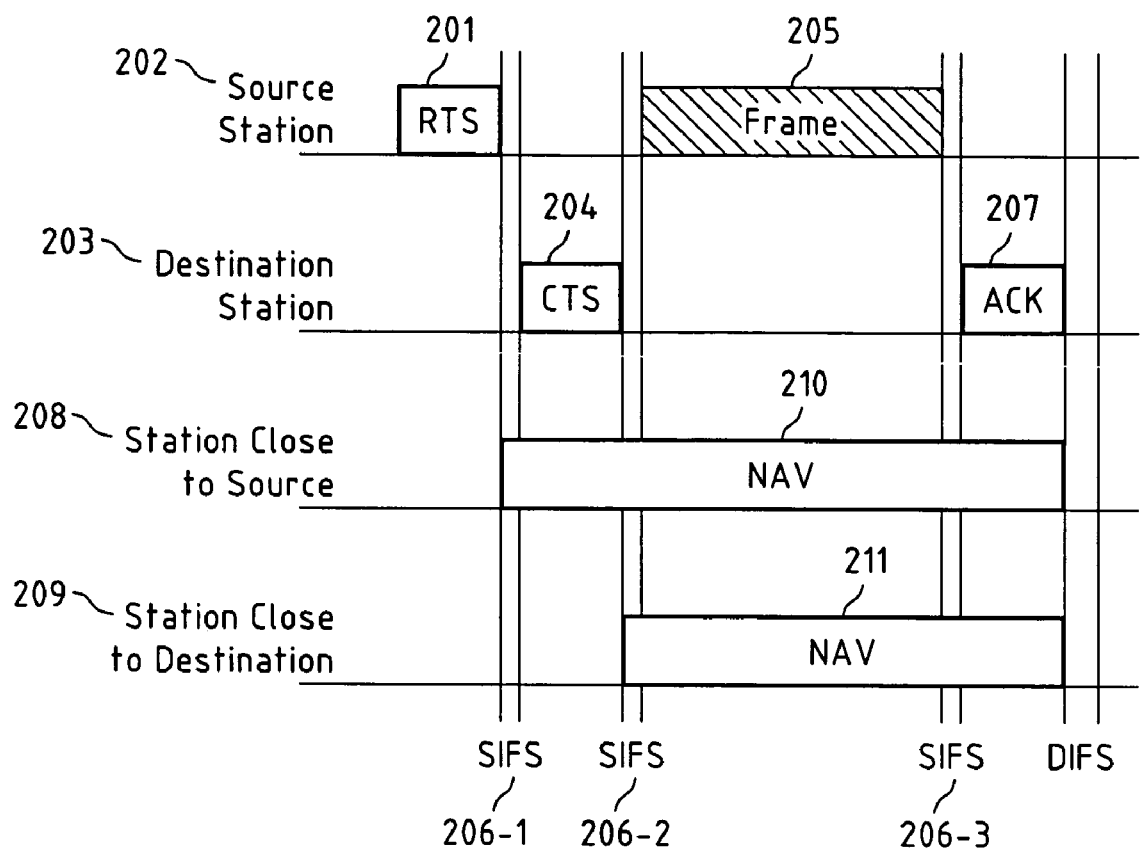
FIG. 2: a timing diagram of acknowledged data packet transfer with Ready-to-Send (RTS)/Clear-to-Send (CTS) polling in a wireless communication system according to the prior art.
Figure 3A:
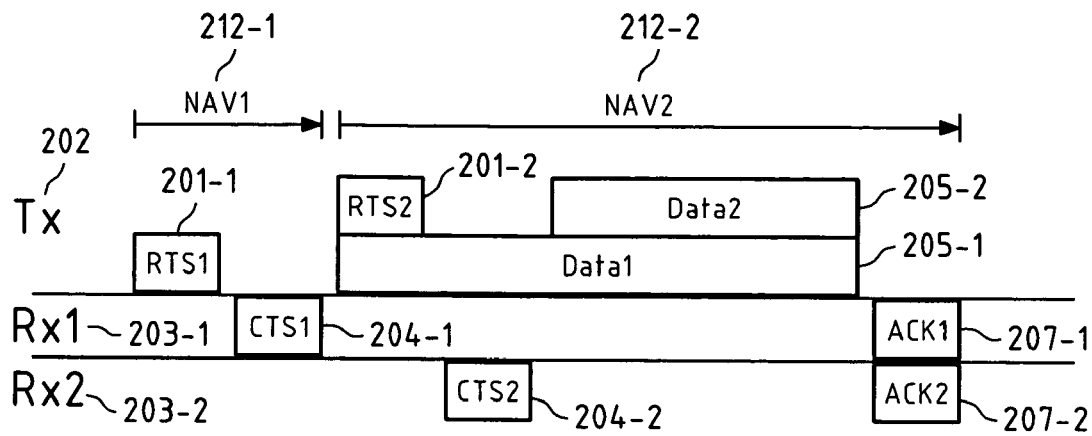
FIG. 3a: a timing diagram of data transfer in a wireless communication system with a spatially selective antenna according to a first embodiment of the present invention.

FIG. 3*a* depicts a timing diagram of data transfer in a wireless communication system with a spatially selective antenna according to a first embodiment of the present invention, wherein time proceeds from left to right. The wireless communication system comprises at least one access point 202 and a plurality of stations, of which a first station 203-1 and a second station 203-2 are considered in FIG. 3*a*. Said access point 202 may equally well be a further station of said wireless communication system.

First, said access point 202 transmits a first RTS message 201-1 that contains an identifier of station 203-1 and a variable that indicates the duration of an intended transmission of a first data packet 205-1 from said access point 202 to said first station 203-1, including the time for the transmission of a first acknowledgment message 207-1 from said first station 203-1 to said access point 202 to confirm proper receipt of said first data packet 205-1. Said first RTS message 201-1 is transmitted with an omnidirectional antenna characteristic and received at least by said-first station 203-1 and said second station 203-2.

The first station 203-1 recognizes the identifier in the first RTS message 201-1 and copies both the identifier and said variable into a first CTS message 204-1. The first station 203-1 then transmits said first CTS message 204-1, which is received by said access point 202. During the reception of said first CTS message 204-1, the access point processes the signals received with its adaptive antenna array to estimate parameters of the spatial channel impulse response between said first station 203-1 and the access point 202, for instance in non-blind fashion based on pilot tones that are contained in the CTS message or in a blind fashion based on a subspace-based high resolution parameter estimation approach.

The second station 203-2 recognizes from the identifier in said first RTS message 201-1 that said RTS message 201-1 is not directed to said second station 203-2, and adjusts its NAV to the prospective end of the data/acknowledgment transmission between said access point 202 and said first station 203-1.

Based on the estimated parameters, the access point 202 then computes a weight vector in order to project a transmission signal that represents said first data packet 205-1 onto the antenna elements of its adaptive antenna array. Said weight vector corresponds to the antenna characteristic that will be used by the adaptive antenna array for the transmission of said first data packet 205-1. Said antenna characteristic, or beam, is designed to direct the transmission power of said access point towards said first station 203-1, i.e. the transmission is spatially selective and causes as less interference power to other stations such as the second station 203-2 as possible while attempting to maximize the SNIR at said first station 203-1. This is achieved by exciting all propagation multipaths between said access point 202 and said first station 203-1 that have been estimated during the reception of said first CTS message 204-1. Alternatively, such knowledge on the spatial channel may be available from a routing table that is kept in said access point 202 and is continuously updated under consideration of the restrictions imposed by the channel coherence time of the spatial channels between said access point 202 and stations 203.

In a prior-art system, said access point 202 would normally set his own NAV to the prospective end of the transmission of said first data packet 205-1, so that only one data packet 205-1 can be transmitted during this time. The virtual carrier-sense mechanism represented by the setting of the NAV normally prohibits the access point 202 to physically sense the transmission medium during the known transmission of a data packet 205-1. However, according to the present invention, said access point is equipped with a spatially selective antenna and capable of transmitting several data packets 205 to several respective stations 203 concurrently in spatial multiplex. To this end, access point 202 has set his NAV 212-1 to an ending time which is significantly before the time the prospective transmission of said first data packet 205-1 and its acknowledgment 207-1 will be finished. When its NAV 212-1 has expired, said access point does not even require to physically sense the transmission medium, because it is informed that the transmission that currently renders the transmission medium busy is the access point's own transmission of a first data packet 205-1 to said first station 203-1. Concurrently to this transmission, which is performed by using a first weight vector to direct a transmission peak towards said first station 203-1, the access point 202 now starts the transmission of a second RTS message 201-2, wherein a second weight vector has been computed by said access point 202 for said transmission of said second RTS message 201-2. The corresponding antenna characteristic directs a transmission null towards said first station 203-1 in order to disturb the ongoing reception of said first data packet 205-1 by said first station 203-1 in a minimum way. However, said second RTS message 201-2 can nevertheless be received by said second station 203-2. Based on an identifier of said second station that is contained in said second RTS message 201-2, said second station 203-2 recognizes that it is polled by said access point 202, resets its own NAV and responds with a second CTS message 204-2.

The access point 202 once again may estimate parameters of the spatial channel between access point 202 and said second station 203-2 during the reception of said second CTS message 204-2. Based on the estimated parameters corresponding to the first station 203-1 and the second station 203-2, the access point 202 now computes a third weight vector for the transmission of a second data packet 205-1 to said second station 203-2, wherein said third weight vector is computed in a way that a transmission peak is directed towards said second station and a transmission null is directed towards said first station 203-1. Said access point may also re-compute that first weight vector that is used for the transmission of said first data packet 205-1 to said first station 203-1 in a way that in addition to said transmission peak directed to said first station, a transmission null is directed towards said second station. Then the concurrent transmission of two data packets 205-1 and 205-2 to two different stations 203-1 and 203-2 is possible. The proper reception of both data packets may be acknowledged by the respective stations 203-1 and 203-2 by respective acknowledgment messages 207-1 and 207-2.

The second NAV 212-2 that may be set by said access point when transmitting said second RTS message 201-2 may either be set to the end of the transmission of said second data packet/acknowledgment, or may once again be chosen shorter in order to allow for the polling of a third station and according transmission of a third data packet.

In said example, the stations 203 are equipped with omnidirectional antennas. To further reduce interference between the stations when transmitting the CTS messages, said stations 203 may use spatially selective antennas as well to direct transmission peaks towards said access point 202 and to direct transmission nulls towards said already receiving stations. Note that is might be necessary for the access point to transmit and receive signals concurrently.

Alternatively, transmission of said first data packet 205-1 may be suspended until the reception of the second CTS message 204-2, so that both the transmission of data packet 205-1 and 205-2 is started at the same time instance. Although some transmission bandwidth is wasted, the vastly simplified hardware at the access point 202 without any need for concurrent transmission and reception and the lapse of the requirement to re-calculate weights may by far outweigh this loss of bandwidth, especially for short RTS and CTS messages. This approach is depicted in FIG. 3*b*.

Figure 3B:
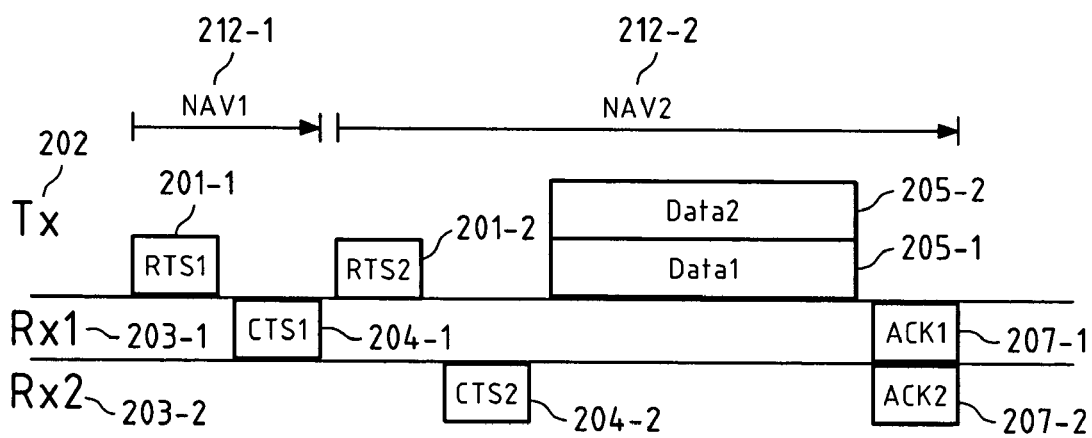
FIG. 3b: a timing diagram of data transfer in a wireless communication system with a spatially selective antenna according to a modified first embodiment of the present invention.

According to FIG. 3*b*, by sending said first RTS message 201-1 and receiving said first CTS message 204-1, said access point 202 has successfully reserved the transmission medium that is shared among a plurality of stations and access points for the duration that is specified in the first RTS message 201-1 and copied into the first CTS message 204-1 by said first station 203-1. This duration is stored in the NAV 212 of said access point 202.

In a prior art system, said access point now would proceed with the transmission of a data packet 205-1 to said first station 203-1. However, according to the present invention, said access point may use the reserved transmission period to poll a further station 203-2 with a second RTS message 201-2 and to await the reception of a second CTS message 204-2 originating from said polled second station 203-2. The remainder of the reserved transmission period then is used for the transmission of data packets to both said first station 203-1 and said second station 203-2 under the use of spatial multiplex. Performing a second polling procedure for the second station 203-2 is possible because the RTS/CTS messages 201/204 are much shorter than the data packets 205, and because the deployment of a spatially selective antenna allows to increase the SNIR at each receiving station 203, so that a higher PHY mode can be used (for instance, QPSK-modulation instead of BPSK-modulation) and, correspondingly, less time for the transmission of the same amount of data is required. To this end, the access point 202 forms a weight vector for the transmission of said first data packet 205-1 towards said first station 203-1, wherein said weight vector corresponds to an antenna characteristic of said adaptive antenna array that has a transmission peak towards said first station and a transmission null towards said second station. Correspondingly, a second weight vector is computed that corresponds to an antenna characteristic with a transmission peak towards said second station 203-2 and a transmission null towards said first station 203-1. The transmission parameters of said first and second station 203-1 and 203-2 required to compute said weight vectors may have been estimated during the reception of said first and second CTS messages 204-1 and 204-2 or may be known in advance, for instance from a routing table. It is advantageous that during the transmission of said second RTS message 201-2 towards said second station 203-2, a transmission null is directed towards said first station 203-1 to prevent that station to become calmed down again. Furthermore, the use of adaptive antennas at the stations 203-1 and 203-2 is possible as well.

Second Embodiment

Figure 4:
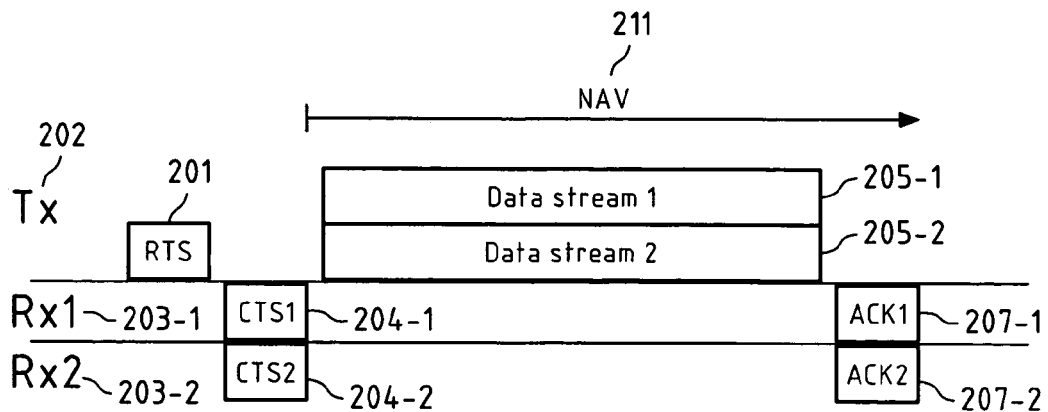
FIG. 4: a timing diagram of data transfer in a wireless communication system with a spatially selective antenna according to a second embodiment of the present invention.

FIG. 4 depicts a timing diagram of data transfer in a wireless communication system with a spatially selective antenna according to a third embodiment of the present invention. In this embodiment, an access point 202 (or any other station of a wireless communication system), transmits an RTS message 201. The RTS message 201 contains the identifiers of two stations 203-1 and 203-2, to which data packets 205-1 and 205-2 are to be concurrently transmitted, and one or more variables that indicate the duration of said prospective data packet transmissions including corresponding acknowledgments 207-1 and 207-2, respectively. Said RTS message 201 may be transmitted in omnidirectional mode, to overcome the hidden station problem by calming down all stations other than said first and second stations 203-1 and 203-2, or with an adaptive antenna array, wherein said RTS message is transmitted with an antenna characteristic that comprises transmission peaks towards said two stations 203-1 and 203-2, and possibly transmission nulls towards further stations the transmission parameters of which are known to said access point 202.

Upon reception of said RTS message, said two stations 203-1 and 203-2 notice that they have been polled by said access point and respond with respective first and second CTS messages 204-1 and 204-2. This may be performed in omnidirectional mode or with spatially selective antennas at each station 203-1 and 203-2. The access point 202 receives the two CTS messages 204-1 and 2, advantageously estimates and updates the transmission parameters of said two stations 203-1 and 203-2, and starts concurrent data transmissions 205-1 and 205-2 towards said first and second station 203-1 and 203-2, respectively. The weight vector, representing the antenna characteristic for the transmission of each data packet 205, is computed by said access point so that the data packet 205-1 is transmitted with a transmission peak towards said first station 203-1 and a transmission null towards said second station 203-2, and vice versa for the transmission of data packet 205-2. This allows for the concurrent transmission of both data packets 205 in spatial multiplex. Both data packets then are acknowledged with acknowledgment messages 207-1 and 207-2, respectively. As indicated by the NAV 211 in FIG. 4, stations that received said RTS message 201 and noticed that they are not polled by said access point adjust their NAV 211 to the end of the prospective transmissions of said data packets 205-1 and 205-2 with corresponding acknowledgments 207-1 and 207-2 and refrain from transmitting during said period, thus causing no interference to the concurrent data packet transmission of said access point 202.

Apparently, the third embodiment of the present invention allows for spatial multiplexing of data packets that are transmitted by one access point 202 (or any other station) on the shared transmission medium. If said RTS message 201 is transmitted spatially selective as well, the number of further stations in the wireless communication system that are calmed down by the RTS message 201 can be reduced, and its is possible for these further stations to initiate data transmissions on their own, even further increasing the throughput on the shared transmission medium.

Third Embodiment

Figure 5:
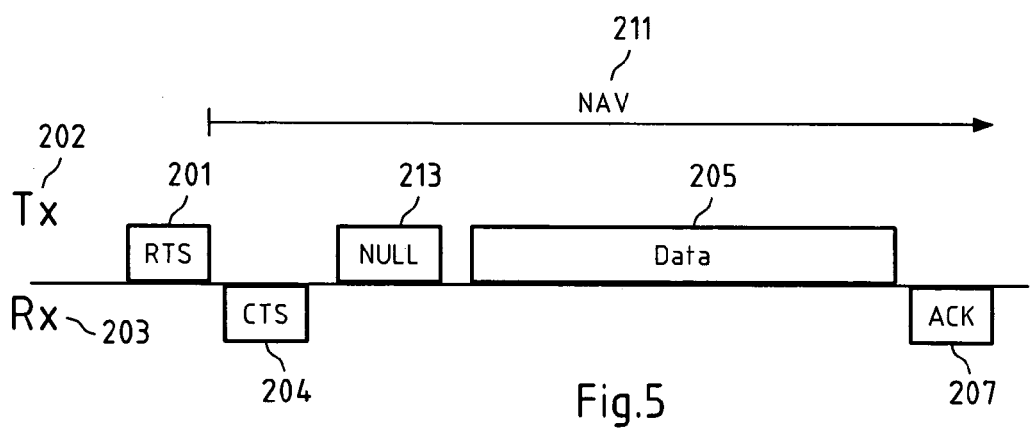
FIG. 5: a timing diagram of data transfer in a wireless communication system with a spatially selective antenna according to a third embodiment of the present invention.

FIG. 5 depicts a timing diagram of data transfer in a wireless communication system with a spatially selective antenna according to a second embodiment of the present invention. An access point 202 (or any other station of a wireless communication system) transmits a first RTS message 201 in omnidirectional mode, which is received by a first station 203. Said first station recognizes an identifier that is contained in said RTS message 201 as well as a variable that indicates the duration of the transmission of a data packet 205 with a corresponding acknowledgment 207. If said identifier in said RTS message 201 identifies said first station 203, said first station transmits a CTS message 204 in omnidirectional mode, which is received by said access point 202. During said reception of said CTS message 204, said access point uses an adaptive antenna array to estimate parameters of the spatial channel between access point 202 and the first station 203, wherein these parameters are required for computing weights that control the antenna characteristic of said adaptive antenna array.

In a prior art system, said access point 202 now would proceed with the transmission of said data packet 205 to said first station 203. Other stations (for instance, stations close to the access point 202) that received said RTS message 201 have set their NAV 211 to an ending time of the prospective transmission of said data packet 205 and its corresponding acknowledgment 207. Thus if one of these further stations wants to transmit a data packet to a yet further station, it has to wait for its NAV 211 to expire until the medium can be physically sensed an a transmission can be started. In contrast to this prior art technique, according to the present invention, the access point 202 transmits a NULL message 213, wherein said NULL message is transmitted within a transmission signal which is projected onto the antenna elements of said adaptive antenna with a weight vector, and wherein said weight vector has been computed based on estimated or a-priori known parameters that describe said spatial channel between said access point 202 and said first station 203. In particular, this weight vector is computed so that the adaptive antenna forms a transmission null towards said first station during the transmission of said NULL message 213. This message will thus not be received by said first station 203. However, said further stations that received said RTS message 201 and were calmed down by this RTS message with their NAVs 211 adjusted accordingly, and would not try to transmit RTS messages or data packets by themselves during the indicated transmission of said data packet 205 and acknowledgment 207, do receive this NULL message 213. The NULL message 213 instructs said further terminals to reset their NAVs to zero, so that further RTS or data packet transmissions initiated by said further stations during the transmission of said data packet 205 from said access point 202 to said station 205, which takes place after the-transmission of said NULL message 213, become possible.

It is advantageous that the access point 202 uses its adaptive antenna array to direct a transmission peak towards said first station when transmitting said data packet 205 to said station 203. In this way, the SNIR at said station 203 is maximized and the RTS or data packet transmissions of said further stations that may now take place concurrently to said transmission of said data packet 205 are interfered with in a minimum way. It may be further advantageous to direct transmission nulls towards said further stations when the transmission parameters of said further stations are known to said access point 202. Furthermore, it is advantageous when said further stations use spatially selective antennas for their RTS and data packet transmissions, so that the reception of said data packet 205 at said first station 203 and of said acknowledgment 207 is disturbed with interference power only to a minimum extent. Finally, said further stations may decide to transmit data packets without performing RTS/CTS polling before, especially when the transmission parameters of that stations the data packets are to be transmitted to are known in advance, e.g. from a routing table.

Fourth Embodiment

Figure 6:
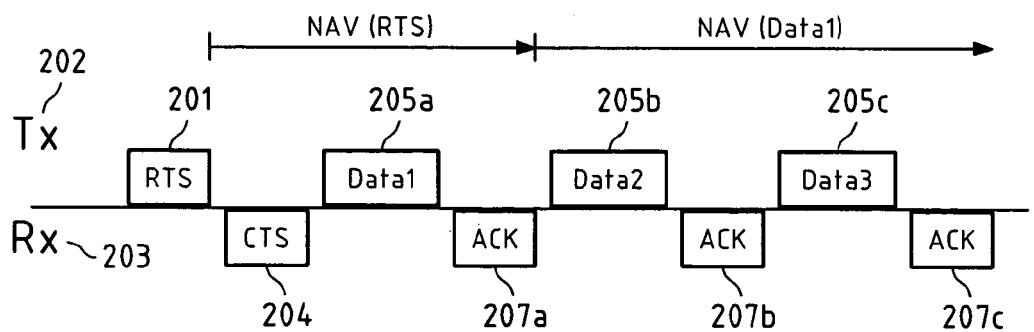
FIG. 6: a timing diagram of data transfer in a wireless communication system with a spatially selective antenna according to a fourth embodiment of the present invention.

FIG. 6 depicts a timing diagram of data transfer in a wireless communication system with a spatially selective antenna according to a fourth embodiment of the present invention. An access point 202 (or any other station of a wireless communication system) transmits an RTS message 201 in omnidirectional mode. This RTS message 201 is intended to trigger a reply of a first station 203, which is expected to recognize the station identifier that is contained in said RTS message 201 and to respond to said RTS message 201 with a corresponding CTS message 204, and to calm down stations that are able to receive the RTS and that are not addressed by said station identifier. In addition to said station identifier, said RTS message 201 includes a variable that indicates the duration a data transmission between said access point 202 and a first station 203, in the course of which a first data packet 205a and an acknowledgment 207a is to be transmitted. Although said access point has a large data packet 205 to transmit to said first station 203, it determines to reserve the transmission medium, which is shared among all stations and access points of a wireless communication system, only for a comparatively small duration, in which only one third of the data packet 205, namely the data packet 205a and its acknowledgment 207a, can be transmitted. The prospective end of this transmission is indicated by the variable that is contained in said RTS message 201, and all stations receiving this RTS message 201 and not being addressed by its station identifier, will only refrain from own transmissions during said period. The rationale behind this approach is that said other stations that receive said RTS message are only calmed down for a comparatively short period of time, and can initiate transmissions on their own after the calm down period. Especially when said access point uses an adaptive antenna array to direct a transmission peak towards the first station during the transmission of data packet 205b and 205c (which are acknowledged by respective acknowledgements 207b and 297c, respectively), concurrent transmissions of data packets from said other stations to their peer stations is possible, advantageously under deployment of spatially selective antennas at said other stations as well. Said first station 203 is informed on the buffer state of said access point 202, which holds two further data packets 205b and 205c after the transmission of said first data packet 205a, by information contained in said first data packet 205a. I.e., when properly receiving said first data packet 205a from said access point 202, said first station 203 is informed on further data transmissions that will immediately follow the transmission of said first data packet 205a, so that no further RTS/CTS polling between said access point and said first station 203 is necessary. With the data packet being 205a being transmitted in spatially selective mode, only said first station and stations that are positioned in the elongation of the beam that is formed by the adaptive antenna array of said access point 202 receive this information on further data packets. By this technique, after an initial calming down of stations in the reception range of said access point and said first station via said RTS message 201 and said CTS message 204, which is reduced to the minimum possible time, concurrent data packet transmission of said access point and further stations that initiate data packet transmissions is feasible, and the throughput on said shared transmission medium can be increased substantially.

Fifth Embodiment

Figure 7A:
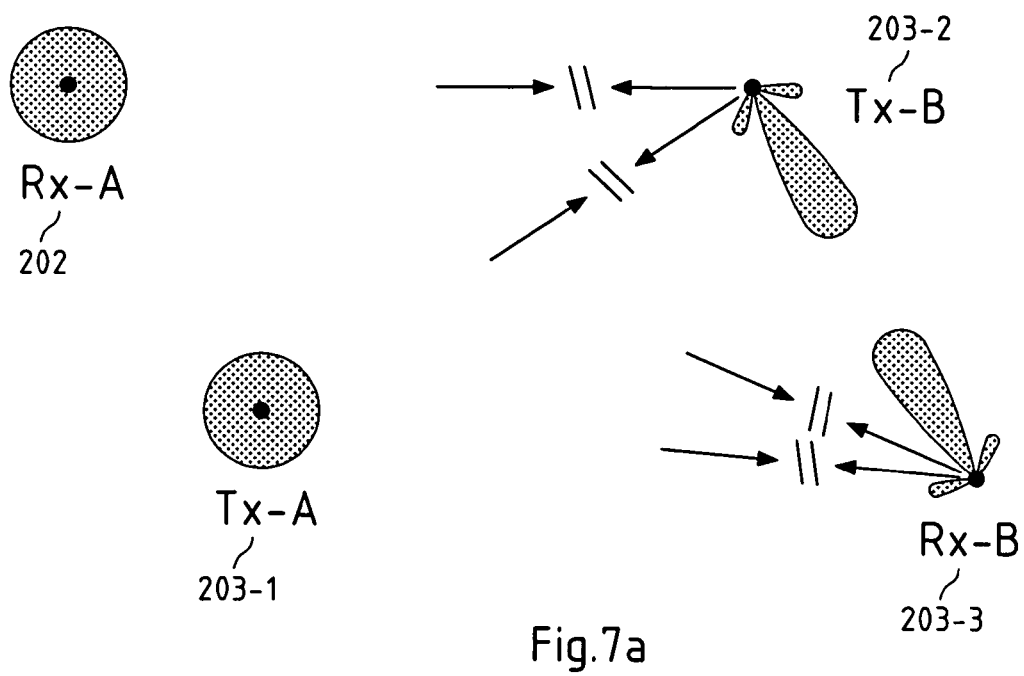
FIG. 7*a*: a scenario depicting data transfer in a wireless communication system with a spatially selective antenna according to a fifth and sixth embodiment of the present invention.
Figure 7B:
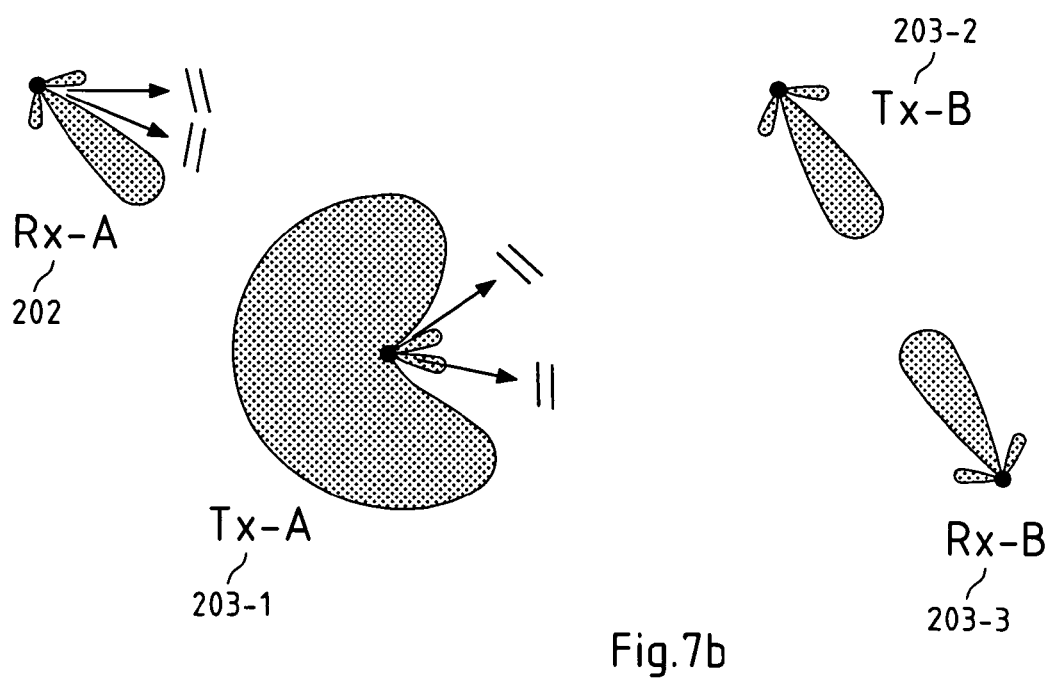
FIG. 7*b*: a scenario depicting data transfer in a wireless communication system with a spatially selective antenna according to a fifth and sixth embodiment of the present invention.

FIGS. 7*a* and 7*b* illustrate data transfer in a wireless communication system with a spatially selective antenna according to a fifth embodiment of the present invention. Said wireless communication system exemplarily comprises an access point 202 (which may as well be a station) and three stations 203-1, 203-2 and 203-3.

According to a fifth embodiment of the present invention, illustrated in the scenario of FIG. 7*a*, said access point has transmitted a RTS message in omnidirectional mode, as indicated by the circle around access point 202 that represents the deployed antenna characteristic. In said RTS message, a station identifier of station 203-1 was included. Upon reception of said RTS message, station 203-1 recognized said station identifier and responded to the RTS message by transmitting a CTS message, also in omnidirectional mode. Both the RTS message and the CTS message were received by said second station 203-2 and third station 203-3, which are both equipped with an adaptive antenna array. Both stations have estimated the transmission parameters required to direct transmission nulls towards said access point 202 and first station 203-1 during said reception, and have adjusted their NAV timer to expire when the data exchange, comprising at least one data packet and one acknowledgment message between said access point 202 and said first station 203-1, is finished. The duration of this data exchange is contained in said received RTS and CTS messages. After the NAV timer has expired, said second station 203-2 physically senses the transmission medium, and if it finds the transmission medium to be idle for an IFS interval, and if its backoff timer has expired as well, it starts a transmission of a data packet, wherein during said transmission, transmission nulls are directed towards said access point 202 and said first station 203-1 (as indicated by the blocked arrows in FIG. 7*a*). As depicted in FIG. 7*a*, it is further advantageous to direct a transmission peak towards said third station 203-3, if the transmission parameters towards this station are known at said second station 203-2. Said third station directs a reception peak towards said second station 203-2 and transmission nulls towards said access point 202 and said first station 203-1, wherein the required transmission parameters of said access point 202 and said first station 203-1 were estimated during the reception of said RTS and CTS message, and wherein said transmission parameters of said second station are estimated during the actual signal reception. The data exchange between said second station 203-2 and said third station 203-3 causes as less interference to other stations as possible due to the use of spatially selective antennas. It is thus possible that said access point 202 and said first station 203-1 are involved in further data exchanges that take place in parallel to said data exchange between said second station 203-2 and said third station 203-3. This is possible because the use of an RTS/CTS polling cycle between said second station 203-2 and said third station 203-3 can be omitted, so that no other stations are calmed down, or because only stations in the elongation of said beams that are created by the adaptive antenna arrays of said second station 203-2 and third station 203-3 during the transmission of RTS and CTS messages are calmed down. The data exchange between station 203-2 and 203-3 thus becomes effectively invisible to the other stations of said wireless communication system.

A scenario where also the access point 202 and said first station 203-1 are equipped with an adaptive antenna array is depicted in FIG. 7*b*. Here, the data exchange between said second station 203-2 and third station 203-3 has already been established without calming down said access point 202 and said first station 203-1, either because no RTS/CTS cycle was used between said second station 203-2 and said third station 203-3, or because the RTS/CTS messages between said stations have been transmitted in spatially selective mode and thus were not received by said access point 202 and said first station 203-1. Said access point 202 thus may initiate a further RTS/CTS cycle or directly start a data exchange with said first station 203-1, wherein at least a transmission peak is directed towards said first station 203-1 and wherein at least a reception peak is directed towards said access point 202, when the access point is transmitting, and vice versa when the first station 203-1 is transmitting. As depicted in FIG. 7*b*, it is further advantageous that during the data exchange between said access point 202 and said first station 203-1, transmission nulls and reception nulls are directed towards said second station 203-2 and third station 203-3, or, more general, to all other stations in said wireless communication system of which the transmission parameters are known, regardless if it is known that these stations are exchanging data concurrently to the data exchange between said access point 202 and said first station 203-1. This minimizes the overall amount of interference power in a wireless communication system. Said transmission parameters of said other stations may have been estimated by said access point 202 and first station 203-1 during preceding RTS/CTS cylces and data exchanges (data packet transmissions and acknowledgment transmissions) that involved said other stations, and may have been stored in a routing table. When computing the weights for the transmission of signals, said access point 202 and first station 203-1 then consider all the transmission parameters in said routing table, possibly under consideration of the actuality of the entries in said routing table. In general, the duration since the estimation of the transmission parameters should be significantly smaller than the channel coherence time, so that the transmission parameters are still exact.

According to the fifth embodiment of the present invention as depicted in FIGS. 7*a* and 7*b*, it is now particularly advantageous to assign the second station 203-2 an IFS that is shorter than the IFS that has to be obeyed by the other stations and access points.

Whereas back-off timers represent an virtual carrier-sense mechanism, that only predict future traffic on said shared transmission medium based on duration information that is announced in RTS/CTS frames as explained above, the determination of the duration of an idle period of said transmission medium can be considered as physical carrier-sense mechanism. According to the prior art, it is preferred that said determination of said idle period of said transmission medium is only performed by second said station 203-2 when said back-off timer in said station has expired and thus indicates that the transmission medium is idle. Thus after the virtual carrier-sense mechanism has indicated the medium to be idle, the physical carrier-sense mechanism actually checks for this idle state of the transmission medium.

However, according to the fifth embodiment of the present invention, at least the second station 203-2 is equipped with a spatially selective antenna array and thus capable of spatial multiplexing techniques. It is thus only natural to grant said second station 203-2 priority when accessing the transmission medium that has to be shared among said station 203-2 and the remaining stations 203 and access points. According to the fifth embodiment of the present invention, this is achieved by allowing said station to start a transmission on said transmission medium already if the transmission medium is physically sensed to be idle for a first IFS (for instance a PIFS), which is smaller than said second IFS that has to be obeyed by said stations and possibly by further devices in said wireless communication system (for instance a DIFS). Said station 203-2 then simply does not have to wait for the second IFS when willing to access said medium with a transmission, but only for the shorter first IFS. When starting the transmission, said stations will be either calmed down, if RTS/CTS messages are transmitted, or will sense after the duration of said first IFS that the medium is no longer idle, so that an idle period of the length of the (standard) second IFS will only be encountered if said device refrains from medium access.

Sixth Embodiment

FIGS. 7a and 7b also illustrate data transfer in a wireless communication system with a spatially selective antenna according to a sixth embodiment of the present invention.

According to FIG. 7a, said second station 203-2 and said third station 203-3 have received the RTS and CTS messages from said access point 202 and first station 203-1, and have set their NAV to the value as indicated in said received RTS and CTS messages. However, said second station 203-2 ignores its own NAV and starts a transmission towards said third station 203-3. This is possible due to the fact that the spatially selective data exchange between said second station 203-2 and third station 203-3 with its extremely small interference contribution is effectively invisible to the other stations of the wireless communication system, so that it is irrelevant if data exchange between said access point 202 and said first station 203-1 has already begun when said second station 203-2 starts a transmission of an RTS message or data packet, directed towards said third station 203-3, or not. The privilege of ignoring its own NAV timer when using a spatially selective antenna may be assigned to any access point or station of said wireless system. As in the fifth embodiment of the present invention, it is also advantageous in the sixth embodiment of the present invention for such privileged stations as the second station 203-2 to direct transmission nulls towards all other stations of said wireless communication system of which transmission parameters are known either from estimation and/or entries in a routing table, so that the overall interference contribution is minimized.

FIG. 7b then may be interpreted as a scenario wherein said access point 202 and first station 203-1 have noticed that there currently exists a data exchange between said second station 203-2 and third station 203-3, for instance because said second station 203-2 and third station 203-3 only direct a transmission peak towards said third station 203-3 and second station 202-2, respectively, but no nulls towards said access point 202 and first station 203-1. Access point 202 either does not set a NAV at all that prevents him from initiating further transmissions before that data exchange between said second station 203-2 and third station 203-3 has finished, or it sets a NAV and ignores it. Access point 202 thus starts a concurrent transmission of a data packet, wherein a transmission peak is directed towards said first station 203-1 and transmission nulls (indicated by the blocked arrows in FIG. 7b) are directed towards said second station 203-2 and third station 203-3. Correspondingly, said first station forms a reception peak towards said access point 202 and reception nulls towards said second station 203-2 and third station 203-3 to spatially cut out the interference received from the concurrent data exchange between said second station 203-2 and third station 203-3.

Both the fifth and the sixth embodiment of the represent effective ways of allowing for increased throughput on the shared transmission medium and to a reduced overall interference output of the wireless communication system, so that also coexistence with further wireless communication systems is improved.

Deployment of a Distributed Antenna

Figure 8:
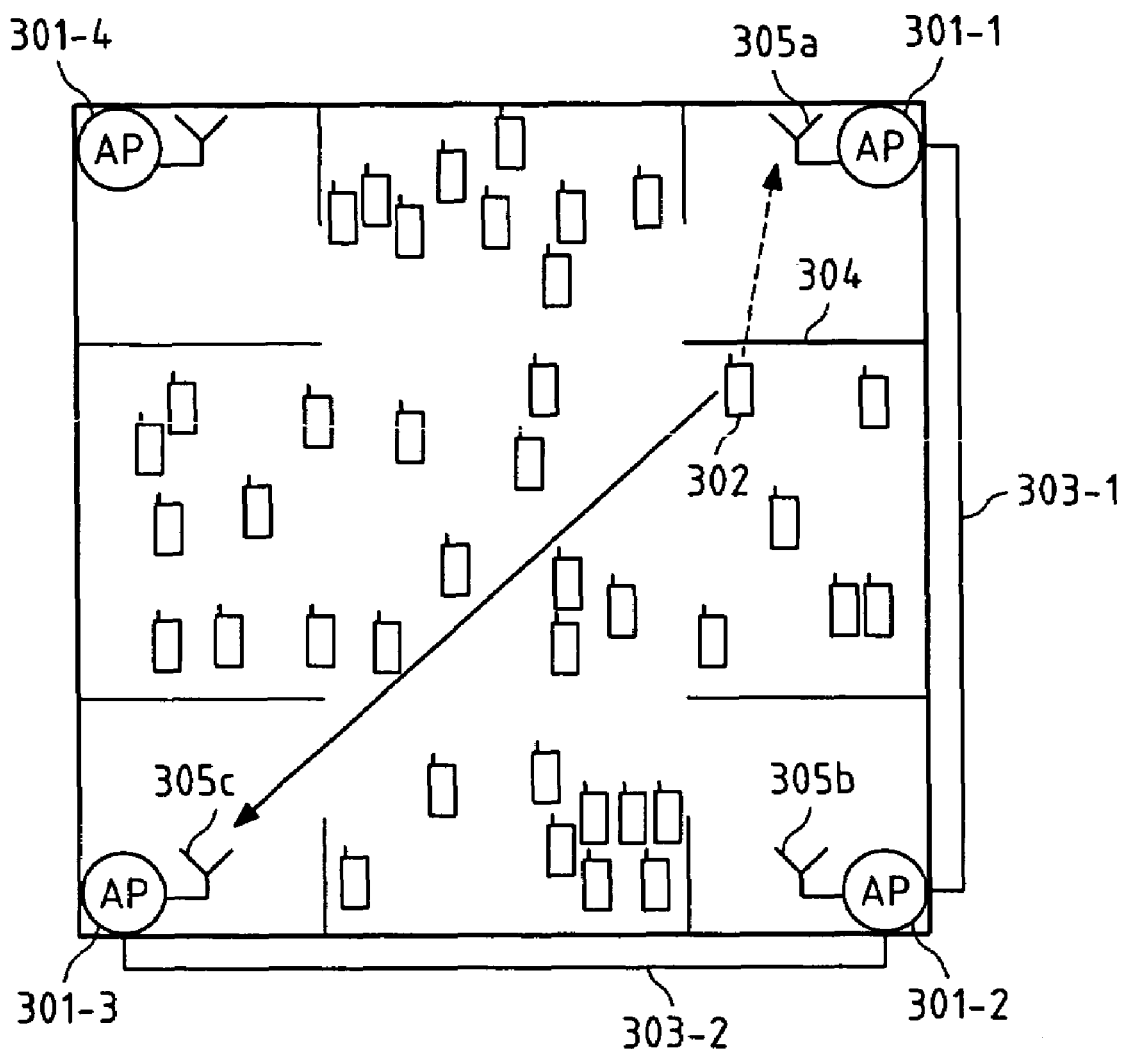
FIG. 8: an illustration of a wireless communication system with a distributed antenna according to the present invention.

FIG. 8 is an illustration of a wireless communication system with a distributed antenna according to the present invention. The communication system consists of four access points 301-1 . . . 301-4 and several stations, of which station 302 will be exemplarily considered. Said access points and stations are contained in a rectangular propagation scenario, for instance a square exhibition hall, which contains eight walls elements, of which wall element 304 is of particular interest.

The access points 301-1, 301-2 and 301-3 are interconnected by two fiber connections 303-1 and 303-2 with associated devices for controlling data transfer over said fiber connection. By interconnecting said access points 301-1, 301-2 and 301-3, a distributed antenna 305 comprising the antenna elements 305a, 305b and 305c of access points 301-1, 301-2 and 301-3, respectively, is created. In the present example, each access point is equipped with one omnidirectional antenna, so that said distributed antenna has three antenna elements 305a, 305b and 305c. Assuming that said exhibition hall has a length and width of 140 m, and that said wireless communication system uses a center frequency of 5 GHz, said 140 m equal 2333 wavelengths of said center frequency, so that said distributed antenna can be considered to provide macro-diversity, i.e. a signal being transmitted from a station is most likely to be received at the antenna elements 305a, 305b and 305c of said distributed antenna 305 with uncorrelated amplitudes and phases due to the large antenna distance and the rich scattering propagation environment that causes different fading for each receive antenna element.

When exemplarily considering station 302, it is readily seen that station 302 is closest to access point 301-1. However, the line-of-sight connection (depicted as dashed arrow in FIG. 8) between station 302 and access point 301-1 blocked by the wall element 304, so that a signal transmitted by said station 302 with an omnidirectional antenna will be heavily attenuated when being received at the antenna element 305a of said access point 301-1. However, station 302 has a direct line-of-sight connection (depicted as straight arrow in FIG. 8) to access point 301-3, and, although the distance between said station 302 and said access point 301-3 is larger than the distance to said access point 301-1, the receive signal at the antenna element 305c at access point 301-3 will be much less attenuated than the receive signal at antenna element 305a at access point 301-1. It is thus for instance possible to perform simple selection combining techniques with the distributed antenna, i.e., only the signal received at the antenna element 305c of access point 301-3 is further processed. However, it is also possible to perform maximum ratio combining with the receive signals at all antenna elements of said distributed antenna elements, which corresponds to directing a reception peak towards said station 302, i.e. to try to receive as much signal power from the propagation paths between said station 302 and the antenna elements 305a, 305b and 305c of said distributed antenna. In the transmission case, similarly all antenna elements 305a, 305b and 305c of said distributed antenna are excited to direct a transmission peak towards said station 302. The joint processing of the transmit and receive signals at the antenna elements 305a, 305b and 305c is possible due to the interconnection of the access points 301-1, 301-2 and 301-3. The distribution of the signals may be jointly controlled by all of said three access points 301-1, 301-2 and 301-3, or may be controlled by one single access point as a master.

Apparently, all above-described embodiments of the present invention that are directed to a wireless communication system with CSMA are suited to use such a distributed antenna in order to transmit and receive RTS/CTS messages, data packets and acknowledgments. However, it should be noted that these embodiments only serve as an example for the deployment of a distributed antenna in a wireless communication system. Quite as well, a distributed antenna can be deployed in a mobile radio system such as the Global System for Mobile Communications (GSM), the Universal Mobile Telecommunications System (UMTS) or cordless communication systems such as the Digital Enhanced Cordless Telecommunication (DECT) system.

Observation of Transmissions of Neighboring Systems

Figure 9:
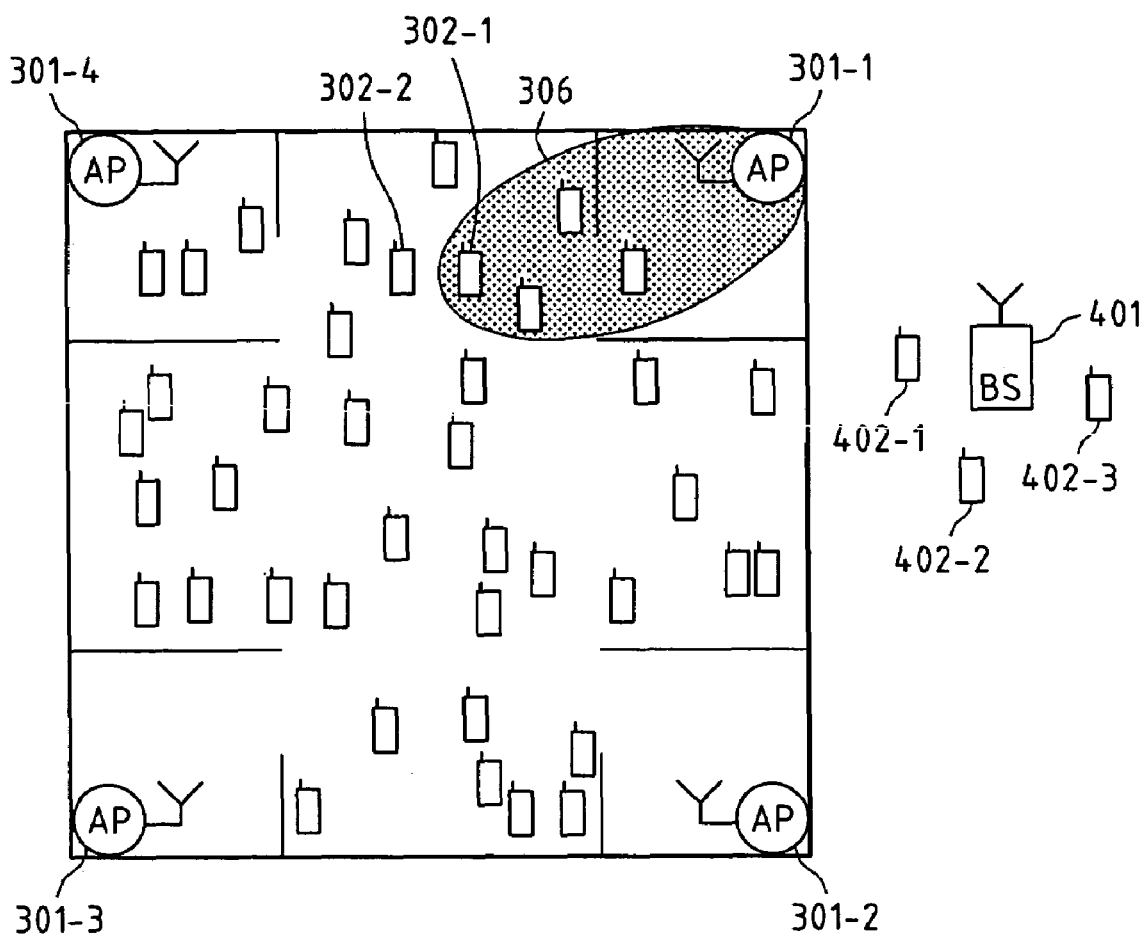
FIG. 9: an illustration of a wireless communication system with observation of transmissions of neighboring communication systems according to the present invention.

FIG. 9 is an illustration of a wireless communication system with observation of transmissions of neighboring communication systems according to the present invention. The wireless communication system comprises four access points 301-1 ... 301-4 and a plurality of stations 302. Each access point 301-1 ... 301-4 is capable of performing data exchange with any of the stations 302 that are within the coverage area of said access point 301-1. The coverage area 306 of said first access point 301-1 is exemplarily depicted in FIG. 9 and represents the area within which the access point 301-1 can transmit and receive signals to stations 302 with an SNIR that is sufficient for a desired signal reception quality, for instance the lowest possible PHY mode in an IEEE 802.11 system. During the transmission of data packets from said access point 301-1 to said station 302-1 within said coverage area 306, said station 302-1 may as well receive interference signals from data packet transmissions that are concurrently initiated by access point 301-4. Such interference between two access points can not even completely be removed by the use of spatially selective antennas at said access points, because it is difficult for said access point 301-4 to know the transmission parameters for the stations in the coverage area 306 of said access point 301-1.

To reduce the amount of interference encountered during the reception of data packets at stations within the coverage area 306 of said access point 301-1, said access point 301-1 monitors the transmissions of said other access points 301-2 ... 301-4. Monitoring said transmission of other access points may comprise receiving said transmissions, identifying said transmissions based on identifiers contained in that received signals and analyzing said received transmissions in order to detect transmission patterns therein. For instance, for each identified access point, the transmissions of said access point may be filled into a time chart, and said time chart then is processed to detect if there are any periodicities or similarities therein, e.g. by applying interpolation or extrapolation techniques. For instance, if one station downloads data from the internet, there will be continuous transmissions of large data blocks of said identified access point followed by short acknowledgments of said station. However, identifying the access point may not be necessary as long as transmission patterns of said access point or of all non-identified access points taken together can be identified. Reception of transmissions from said other access points by said access point 301-1 may be improved by the deployment of a spatially selective antenna, which may further allow for the estimation of transmission parameters of said other access points that may be used to direct transmission peaks or transmission nulls towards said other access points. According to the present invention, said access point 301-1 adapts its own transmissions to said detected transmission patterns of said other access points 301-2 ... 301-4. In this way, the situation may be avoided that a station 302-1 at the border of the coverage area 306 of access point 301-1 is receiving a data packet from said access point 301-1 and is heavily disturbed by data packets transmitted to a station 302-2 positioned in the close vicinity of station 302-1, wherein said transmitted data packets stem from access point 301-4. Access point 301-1 has observed the preceding transmissions of access point 301-4 and has anticipated the data transmission to said station 302-2, and temporally de-correlates the transmission of a data packet to station 302-1, i.e., transmits a data packet to another station in its coverage area 306 and performs the transmission of said data packet to station 302-1 later.

When transmission parameters from other access points are known due to estimation performed at said access point 301-1 with a spatially selective antenna, adapting the transmissions of said access point 301-1 to said transmissions of other access points may be performed under consideration of both the temporal and spatial characteristics of the transmissions of the other stations.

As depicted in FIG. 9, said access point may as well observe the transmissions of a base station 401 of a different wireless communication system comprising said base station 401 and three stations 402-1 ... 402-3, for instance a further WLAN or a mobile communication system, which may be operated according to a different standard, but nevertheless be able to cause interference to said wireless communication system said access point is operating in. Of course, identification of said base station then is no longer possible, but it is still possible to detect the transmission patterns in general, for instance by considering all transmissions that can not be identified as to stem from one surrogate transmitter. Furthermore, the signal format may be analyzed in order to detect from which kind of transmitter a signal was transmitted.

Apparently, by observing the transmission of other base stations and access points, the access point 301-1 according to the present invention improves the coexistence of access points 301-1 ... 301-4 within said communication system and also the coexistence of the wireless communication system of said access point 301-1 and the wireless communication system of said base station 401. Said observation techniques are only exemplarily explained for a WLAN system with an adaptive antenna array, as in the above-mentioned embodiments of the present invention. Observing the transmission of coexisting communication systems can for instance also be applied in mobile radio systems such as the Global System for Mobile Communications (GSM), the Universal Mobile Telecommunications System (UMTS) or cordless communication systems such as the Digital Enhanced Cordless Telecommunication (DECT) system. Furthermore, the use of a spatially selective antenna or a distributed antenna is optional for the presented observation techniques.

Figure 10:
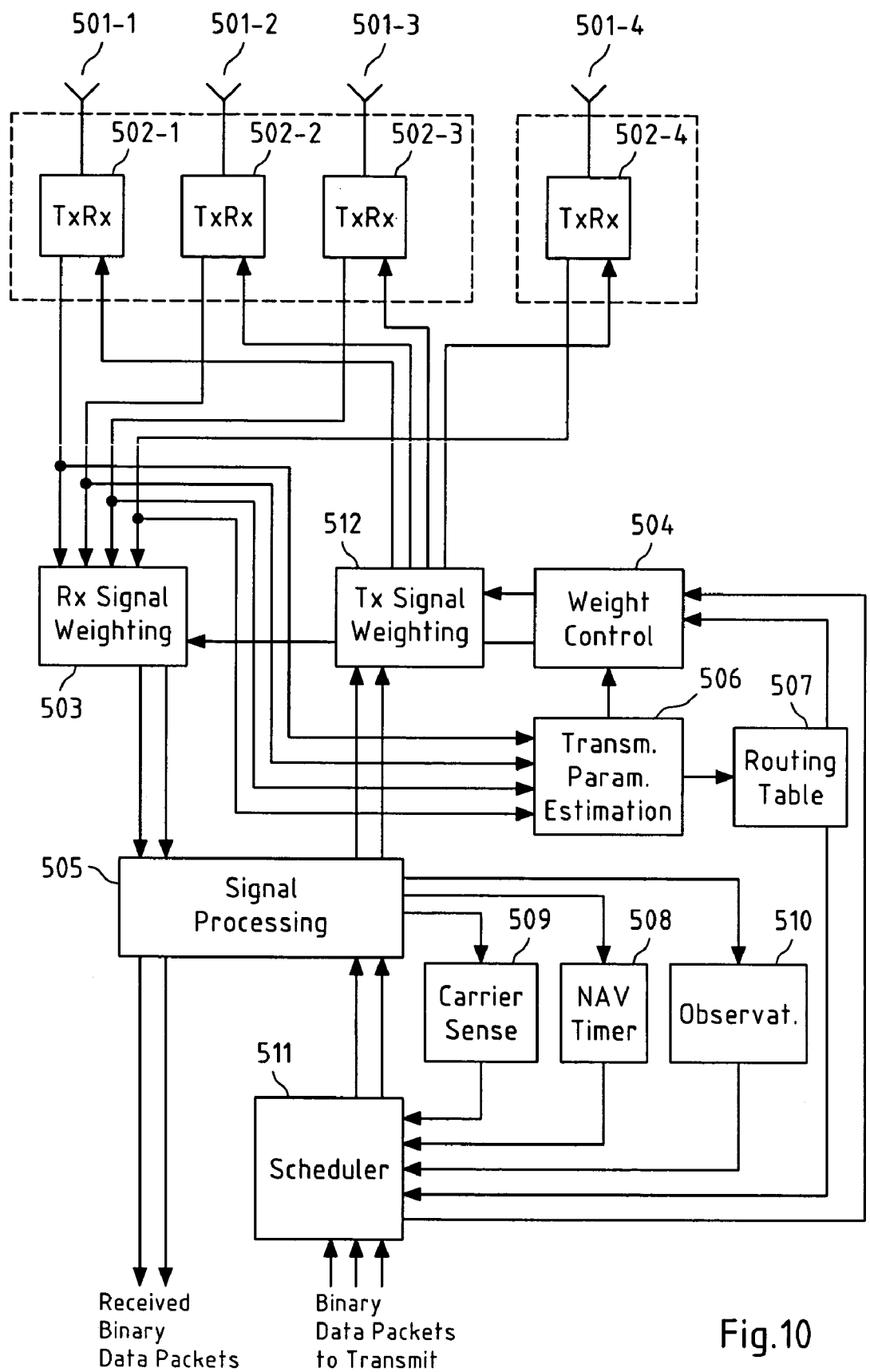
FIG. 10: a schematic representation of the basic set-up of a device to be used in a wireless communication system according to the present invention.

FIG. 10 is a schematic representation of the basic set-up of a device to be used in a wireless communication system according to the present invention. Said device may be either an access point or a station of a wireless communication system or be integrated therein. Said device comprises a plurality of antenna elements 501-1 ... 501-4 with associated Transmit/Receive (TxRx) modules 502-1 ... 502-4 that perform signal amplification, frequency conversion, etc. Said antenna elements actually belong to two devices in said wireless communication system, i.e., antenna elements 502-1 ... 502-3 form the antenna elements of a first device, for instance a first access point, whereas antenna element 502-4 belongs to a second device (indicated by the dashed boxes). Said antenna elements may for instance be patch antennas or omnidirectional antennas. Although said antenna elements 502-1 ... 502-4 belong to two different devices, they are interconnected in a way that joint signal transmission and reception is possible. Said antenna elements 502-1 ... 502-4 thus form a distributed antenna. However, the description of the device as depicted in FIG. 10 is by no means limited to devices that deploy a distributed antenna, but is suitable for each device with a spatially selective antenna.

In the reception case, the signals received at each antenna element 502-1 ... 502-4 are amplified and mixed down to an intermediate frequency or to the base-band, and are weighted in a receive signal weighting instance 503 with in general complex-valued weight factors that are contained in a weight vector that has been computed by a weight control instance 504. In effect, the receive signal as output by each TxRx module 502-1 ... 502-4 are multiplied with one of said weight vectors, respectively and subsequently added to yield one spatially filtered signal for each weight vector that has been determined by said weight vector control instance 504. Each of said weight vectors corresponds to one station from which a signal is to be received, i.e. the antenna characteristic that corresponds to said weight vector comprises a reception peak towards said station and possibly reception nulls towards other stations. Said spatially filtered signals, that represent estimates of the signals as originally transmitted by each respective station, are then fed into a signal processing instance 505, where base-band signal processing is performed to de-modulate the spatially filtered signals and to perform error correction. If said TxRx modules 502-1 ... 502-4 only perform conversion of the received signal to an intermediate frequency, a further mixing step may be included in said signal processing instance 505. In an OFDM system, this blocks also contains a Fast Fourier Transform to allow for conversion of signals between the time and frequency domain. Said signal processing instance then separately outputs binary data packets corresponding to each respective station said device intended to receive data from.

Said receive signals as output by each TxRx module 502-1 ... 502-4 are further fed into a transmission parameter estimation instance 506, wherein blind or non-blind signal processing algorithms are applied in order to estimate transmission parameters that are required to direct transmission and reception peaks or nulls towards stations. For instance, such transmission parameters may be the DOAs of all propagation paths in a spatial channel between a station and the receive antenna array 502, the attenuation, Doppler shift or delay of each of said propagation paths, or the spatial channel impulse response itself. That transmission parameters are fed into said weight control instance 504 and are stored in a routing table 507, which possesses entries for each station for which transmission parameters have been estimated and further entries that characterize the stored data, for instance the last update time, the assessed accuracy of an estimation, etc. Said routing table 507 also has a connection to said weight control instance 504 which is of particular importance if a weight vector corresponding to an antenna characteristic with reception peaks or nulls towards a station of which is not currently transmitting is to be determined.

Said signal processing instance 505 also provides functionality to process the information contained in said spatially filtered receive signals. For instance, if an RTS or CTS message is received, said signal processing instance may recognize a station identifier and a variable that indicates a duration of a prospective data exchange between an access point and a station or between two access points and may set a NAV timer 508 accordingly. Said signal processing instance also feeds signals into a physical carrier sensing instance 509. Finally, said signal processing instance feeds signals into an observation instance 510 that provides functionality to perform the observation and the monitoring of transmissions that stem from devices within or without said communication system in order to improve the coexistence of devices in said wireless communication system and of different types of systems.

Said carrier sensing instance 509, said NAV timer 508 and said observation instance 510 feed their respective output signals into a scheduling instance 511.

In the transmission case, said scheduling instance 511 determines if binary data packets determined for the transmission to different stations can be concurrently transmitted by means of spatial multiplexing and if coexistence restrictions require one of the binary data packets to be suspended, because transmission of said binary data packet as a data packet to said respective station would cause the station to suffer from interference from a neighboring system the transmissions of which have been observed by said observation instance 510. Furthermore, virtual and physical carrier sensing based on the output signals of the carrier sensing instance 509 and the NAV timer 508 is performed by said scheduling instance 511. The scheduling instance 511 has further access to said routing table 507, so hat transmission parameters of stations to which data packets are to be transmitted can be considered in the spatio-temporal scheduling process. The binary data packets that are scheduled for concurrent transmission by said scheduling instance 511 are then fed into said signal processing instance 505, where they are coded and modulated. They are then fed into a transmit signal weighting instance 512, wherein they are multiplied with a respective weight vector as computed by said weight vector control instance 504, which is triggered by said scheduling instance 511. For instance, if two data packets are to be transmitted to two respective stations, the scheduling instance instructs the weight control instance to compute a first weight vector for the first data packet, wherein said weight vector corresponds to an antenna characteristic with a transmission peak towards said first station and a transmission null towards said second station, and a second weight vector for the second data packet with a transmission peak towards said second station and a transmission null towards said first station. In said transmit signal weighting instance, the modulated base-band signal corresponding to the first data packet is multiplied with a first weight factor contained in said first weight vector and fed into said TxRx module 502-1 of said first antenna element, whereas said base-band signal is multiplied with a second weight factor in said first weight vector and fed into said TxRx module 502-2, etc. In the same way, the modulated base-band signal corresponding to the second data packet is multiplied with the weight factors contained in said second weight vector and fed to the respective TxRx modules 502-1 ... 502-4 of said antenna elements 501-1 ... 501-4. In said TxRx modules, the base-band signals are converted to a radio frequency and amplified, and then fed to the respective antenna elements 501-1 ... 501-4.

The invention has been described above by means of preferred embodiments. It should be noted that there are alternative ways and variations which are obvious to a skilled person in the art and can be implemented without deviating from the scope and spirit of the appended claims. In particular, the present invention is not only restricted to application in an access point, where a large amount of data is to be distributed to a plurality of stations and where the relation between downlink traffic and uplink traffic is asymmetric, as it is for instance the case in browsing applications that run on said stations. The invention is equally well suited for application in systems with symmetric uplink and downlink traffic, or with increased uplink traffic, and is also applicable to stations and relay stations of such a wireless communication system. The invention thus may be deployed in single-hop or multi-hop networks. Furthermore, the transmission of messages and data packets is not restricted to single-cast, but also is possible in multi-cast situations. When concurrent transmissions between a first and a second station, and a third and a fourth station, concurrently, it is not necessarily required that all stations use spatially selective antennas. If said first station and third station use adaptive antennas to receive packets from said second and fourth station, respectively, the transmission power of the second and fourth station may be reduced, because the antenna gain of said first and third stations is higher as compared to a reception in omnidirectional mode. This applies to all embodiments of the present invention.

The invention claimed is:

1. A device to be used in a wireless communication system with CSMA-based MAC, comprising:
    means for transmitting at least a first and second Request-to-Send (RTS) messages and at least a first and second data packets on a transmission medium, and
    a spatially selective antenna,
    wherein said second RTS message is transmitted after said first RTS message and before said transmission of said first data packet is finished, wherein said at least first and second data packet are transmitted on said transmission medium at least partially in parallel, and wherein said device uses said spatially selective antenna to direct a transmission null towards a first station for the transmission of said second RTS message, to direct a transmission peak towards said first station for the transmission of said first data packet, and to direct a transmission peak towards a second station for the transmission of said second data packet.

2. The device according to claim 1, wherein said device further uses said spatially selective antenna to direct a transmission null towards said second station for the transmission of said first data packet, and to direct a transmission null towards said first station for the transmission of said second data packet.

3. A device according to claim 1, wherein said first RTS message is transmitted with an omnidirectional antenna characteristic.

4. A device according to claim 1, further comprising
    means for receiving Clear-to-Send (CTS) messages that are transmitted by said stations in reply to said RTS messages and Acknowledgement (ACK) messages that are transmitted by said stations in reply to said data packets,
    wherein said device uses said spatially selective antenna to direct according reception peaks and reception nulls towards said transmitting stations so that at least two messages that are transmitted by at least two of said stations at least partially in parallel on said transmission medium, respectively, can be properly received by said device.

5. The device according to claim 4, further comprising
    means for estimating transmission parameters that are required to direct transmission and/or reception peaks or nulls towards said stations,
    wherein said transmission parameters are at least partially estimated from receive signals at said spatially selective antenna that originate at least partially from said CTS and/or ACK messages that are transmitted by said stations, or from RTS messages and data packets that have been transmitted by said stations before.

6. The device according to claim 1, further comprising:
    means for transmitting and/or receiving signals to and/or from stations that use spatially selective antennas.

7. The device according to claim 1, further comprising:
    means for determining the duration of an idle period of said transmission medium,
    wherein said device is allowed to start a transmission on said transmission medium only if the duration of said idle period is larger than a first interframe space (IFS), which is chosen smaller than a second IFS that has to be awaited in said wireless communication system by default in order to prioritize medium access of said device.

8. The device according to claim 1, wherein said spatially selective antenna is a sectored antenna with dynamically activated sectors, or a switched beam antenna, or an adaptive antenna array with controllable weights.

9. The device according to claim 1, wherein said spatially selective antenna is a distributed antenna consisting of the antenna elements of at least two devices of said wireless communication system, wherein said devices are access points or stations of said wireless communication system that are connected by means of a wired or wireless link so that signals transmitted from and/or received at the respective antenna elements can be jointly processed.

10. The device according to claim 1, further comprising:
    means for controlling a transmission power that is emitted by said device and/or by said stations,
    wherein said power control is performed in order to reduce an overall interference power while providing a Signal-to-Noise-and-Interference Ratio that is required for correct signal reception at both said device and said stations.

11. The device according to claim 1, further comprising:
    means for observing the transmissions of other devices within and/or outside said communication system,
    means for analyzing the observed transmissions in order to detect transmission patterns therein, and
    means for at least partially adapting the transmissions initiated by said device to said detected transmission patterns in order to reduce interference between said device and said other devices.

12. The device according to claim 1, wherein said device represents an access point, a station or a relay in a wireless communication system.

13. The device according to claim 1, wherein said wireless communication system is operated according to the IEEE 802.11 standard or a derivative thereof, including the IEEE 802.11 g standard.

14. The device according to claim 1, wherein said wireless communication system is a point-to-point or point-to-multipoint directional radio link system that replaces the transmission lines of an xDSL system.

15. A device to be used in a wireless communication system with
CSMA-based MAC, comprising:
- means for transmitting one Request-to-Send (RTS) message and at least a first and second data packets on a transmission medium, and
- a spatially selective antenna,
- wherein said one RTS message contains information on at least a first and a second stations to which said at least first and second data packet are to be transmitted, respectively, wherein said device uses said spatially selective antenna to direct a transmission peak towards said first station for the transmission of said first data packet and a transmission peak towards said second station for the transmission of said second data packet, and wherein said transmission of said first data packet takes place at least partially in parallel to the transmission of said second data packet.

16. A device to be used in a wireless communication system with CSMA-based MAC, comprising:
- means for transmitting a first Request-to-Send (RTS) message and a data packet on a transmission medium,
- means for transmitting a NULL message, which indicates that said transmission medium is idle, and
- a spatially selective antenna,
- wherein said NULL message is transmitted after the transmission of said first RTS message and before the transmission of said data packet is finished, and wherein said device uses said spatially selective antenna to direct a transmission null towards a first station for said transmission of said NULL message and to direct a transmission peak towards said first station for said transmission of said data packet.

17. A method to be used in a wireless communication system with CSMA-based MAC, comprising the steps of:
- transmitting a first Request-to-Send (RTS) message on a transmission medium;
- transmitting a second RTS message on the transmission medium; and
- transmitting at least a first and second data packets on the transmission medium,
- wherein said at least first and second data packets are transmitted on said transmission medium at least partially in parallel, and
- wherein a spatially selective antenna is used to direct a transmission null towards a first station for the transmission of said second RTS message, to direct a transmission peak towards said first station for the transmission of said first data packet, and to direct a transmission peak towards a second station for the transmission of said second data packet.

* * * * *